United States Patent [19]

Takagi

[11] Patent Number: 5,381,208
[45] Date of Patent: Jan. 10, 1995

[54] AUTOMATIC LIGHT ADJUSTMENT DEVICE FOR CAMERA

[75] Inventor: Tadao Takagi, Kanagawa, Japan

[73] Assignee: Nikon Corporation, Tokyo, Japan

[21] Appl. No.: 127,484

[22] Filed: Sep. 28, 1993

Related U.S. Application Data

[63] Continuation of Ser. No. 890,708, May 29, 1992, abandoned.

[30] Foreign Application Priority Data

Jun. 3, 1991 [JP] Japan ................. 3-160140

[51] Int. Cl.⁶ .............................................. G03B 15/05
[52] U.S. Cl. ................................ 354/415; 354/416
[58] Field of Search ................ 354/416, 417, 402, 413, 354/432, 400, 415

[56] References Cited

U.S. PATENT DOCUMENTS

| | | | |
|---|---|---|---|
| 4,774,401 | 9/1988 | Yamada et al. | 354/432 X |
| 5,111,231 | 5/1992 | Tokunaga | 354/402 |
| 5,164,759 | 11/1992 | Yasukawa | 354/415 |
| 5,168,300 | 12/1992 | Yaskuawa | 354/415 |
| 5,172,157 | 12/1992 | Takagi | 354/415 |

*Primary Examiner*—W. B. Perkey
*Attorney, Agent, or Firm*—Oliff & Berridge

[57] ABSTRACT

A proper light adjustment with respect to a main object can be performed even if a main object is present in divisional photometry regions in which there is a high reflectance object or divisional photometry regions in which there is, for example, a distant background view of a mountain.

The apparatus according to the present invention includes a photometer device 13 which divides light reflected by an object into a plurality of regions so as to receive light, a focal point adjustment mode setting switch 41 for transmitting focal point adjustment mode information of an automatic focal point adjustment device and a control circuit 31 for calculating a proportion of contribution of a plurality of photometric outputs a transmitted from the photometer device 13 to light adjustment in accordance with an output from the focal point adjustment mode setting switch 41 so that light to be emitted from a flashing device 11 is controlled in accordance with the thus calculated proportion.

33 Claims, 19 Drawing Sheets

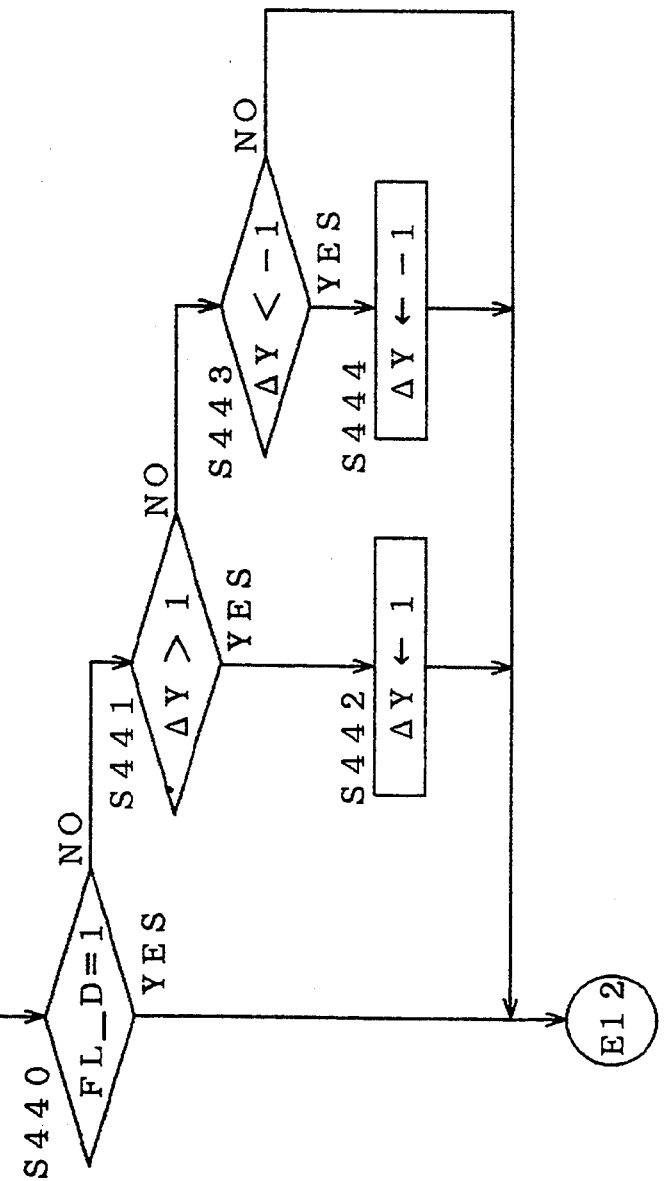

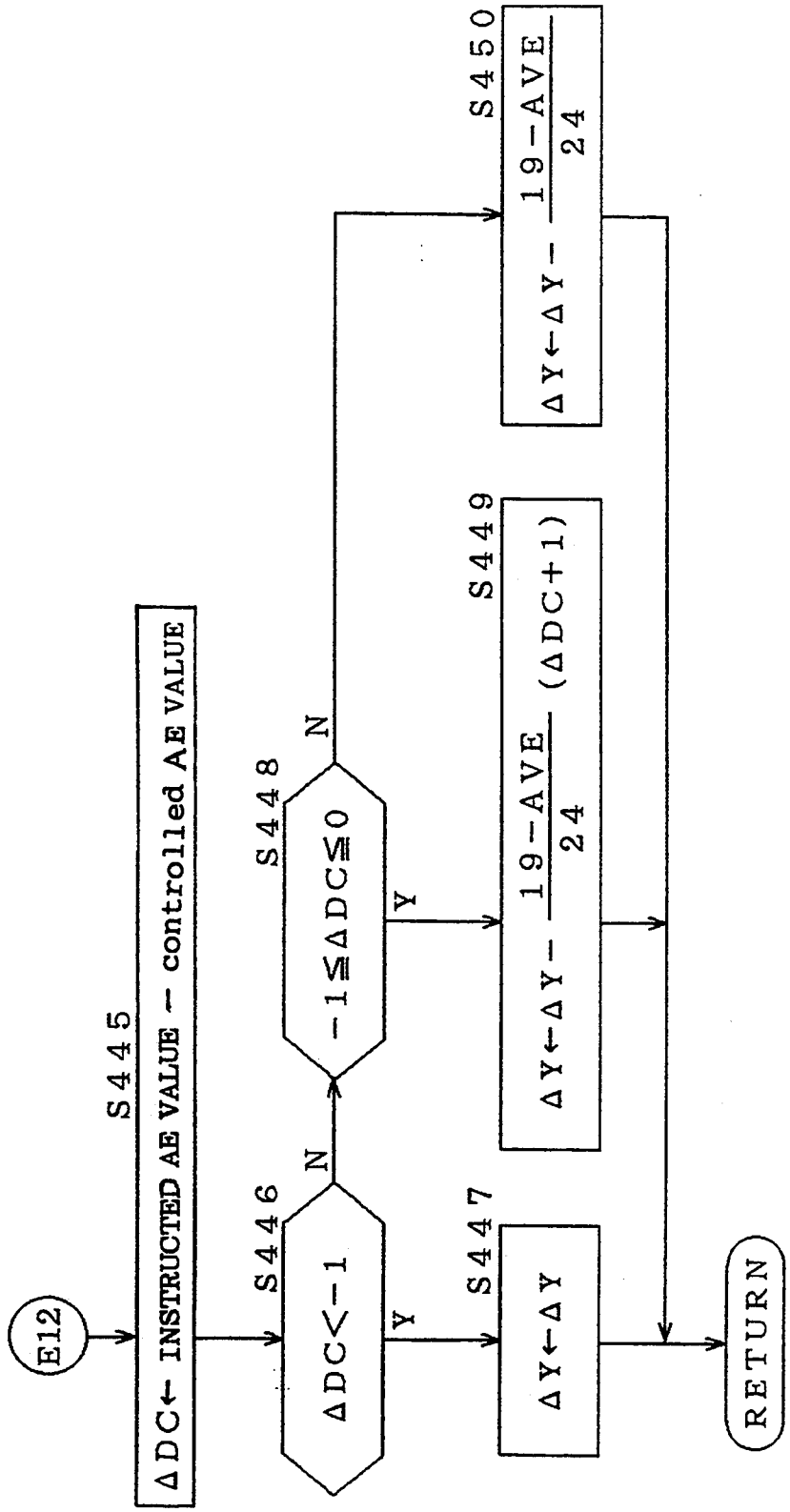

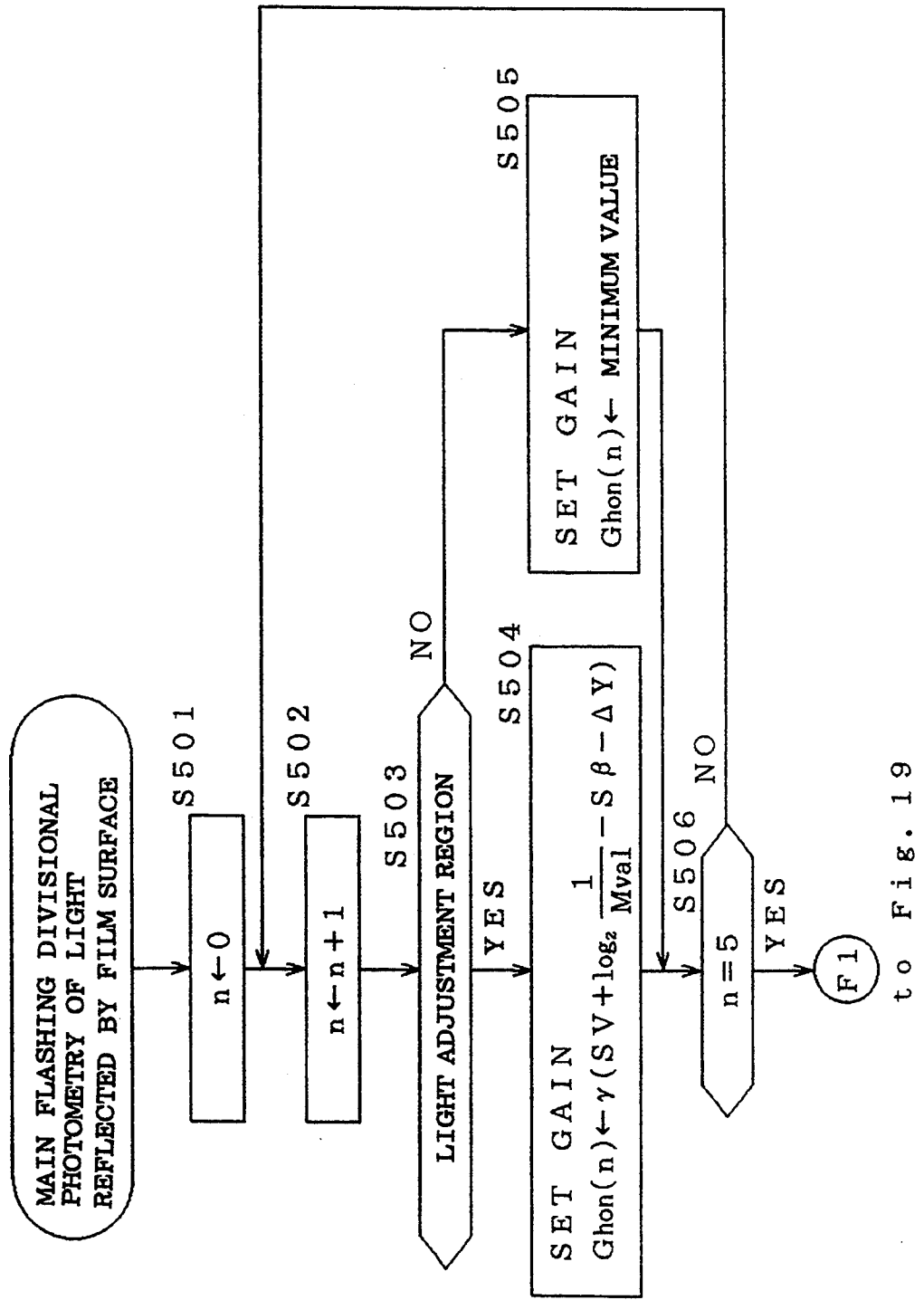

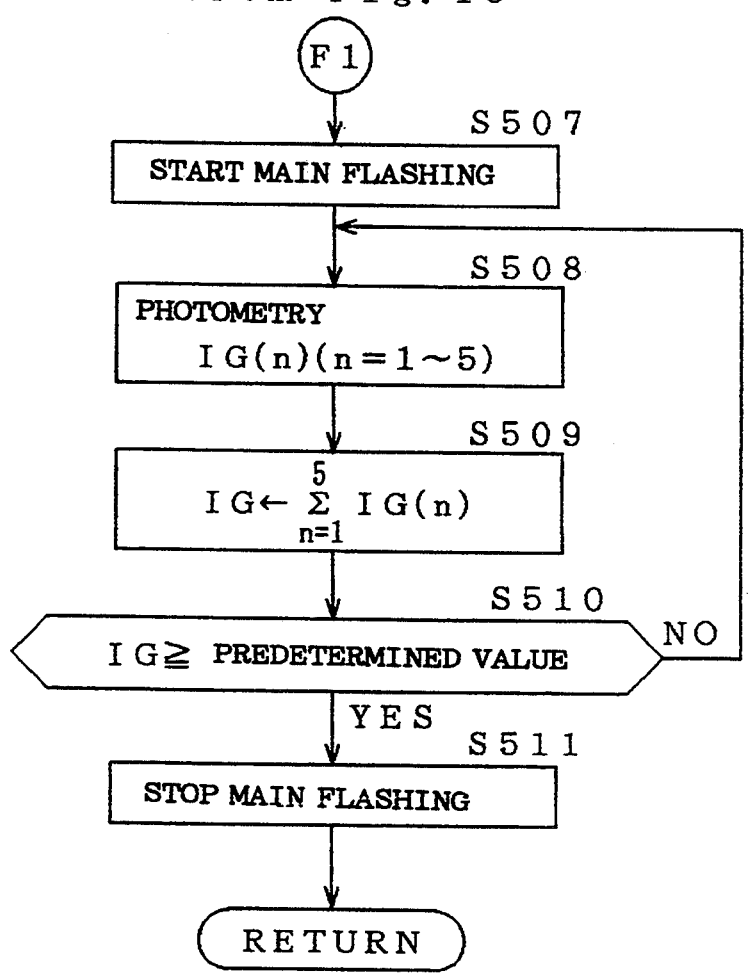

AUTOMATIC LIGHT ADJUSTMENT DEVICE FOR CAMERA

This is a Continuation of Application Ser. No. 07/890,708 filed May 29, 1992, now abandoned.

BACKGROUND OF THE INVENTION

1. Field of the Invention

The present invention relates to an automatic light adjustment device in which light emitted from a flashing device and reflected by an object is measured by a photometer device divided into a plurality of regions and in which light to be emitted from the flashing device is adjusted in accordance with an output from the photometer device.

2. Related Background Art

The applicant of the present invention has disclosed an automatic light adjustment device in which a flashing device performs preliminary flashing prior to main flashing performed for the purpose of lighting an object at the time of photographing and light for use at the main flashing is adjusted in accordance with a photometry output denoting the result of photometry obtained at the time of the aforesaid preliminary flashing (see, for example, U.S. Ser. No. 789,967 filed on Nov. 12, 1991).

In the above-mentioned automatic light adjustment device, a photometry is performed on a light reflected from an object at the time of preliminary flashing by a photometer device thereof and for example, a region from which strong light is reflected due to presence of a high reflectance substance such as a mirror or a region from which weak light is reflected because the background is positioned far away is extracted as a problem region in accordance with a photometry signal so that light adjustment is performed by excluding the photometry output from the extracted problem region at the time of the main flashing. The use of the automatic light adjustment device thus structured will raise a probability of performing proper light adjustment.

However, with the conventional automatic light adjustment device for a camera, if light reflected by a main object present in the field is received by the photometer device corresponding to the above-mentioned problem region, the photometry output is excluded and therefore a problem arises in that a proper light adjustment with respect to the main object may not be performed. In particular, cameras having an automatic focal point adjustment (AF) device encounter a critical problem because the focal point of the photographic lens is mainly focused on the main object.

SUMMARY OF THE INVENTION

An object of the present invention is to provide an automatic light adjustment device capable of performing a proper light adjustment with respect to a main object even if a main object is present in a photometry region in which there is a high reflectance object or a photometry region in which there is, for example, a distant background view.

In order to achieve the above-mentioned object, an automatic light adjustment device for a camera according to the present invention has an automatic focal point adjustment device for controlling a photographic lens to a focusing position in accordance with a result of focal point detection; photometer means which divides light emitted from a flashing device at the time of main flashing and reflected by an object into a plurality of photometry regions so as to receive light; light adjustment means for adjusting light to be emitted from the flashing device in accordance with a plurality of photometry outputs transmitted from the photometer means, focal point adjustment information output means for outputting information about focal point adjustment of the automatic focal point adjustment device; and calculating means for calculating a proportion of contribution of each photometric output transmitted from the photometer means to light adjustment in accordance with an output from the focal point adjustment information output means, wherein the light adjustment means controls light to be emitted from the flashing device in accordance with the calculated proportion.

The above-mentioned information about the focal point adjustment may include, as a focal point adjustment mode, at least a continuous automatic focus mode in which the photographic lens is continuously moved so as to always focus on an object and a single automatic focus mode in which, if the photographic lens once focuses the subject, ensuing focal point adjustment operation is stopped. In this case, the calculating means includes a light adjustment region determining means for determining a light adjustment region, which is substantially used to light adjustment control performed by the light adjustment means at the time of the main flashing from a plurality of the photometry regions. The light adjustment region determining means determines a substantially central photometry region, which overlaps a focal point detection region, to be the light adjustment region among the photometry regions in the continuous automatic focus mode and determines the light adjustment region in accordance with each photometry output from a plurality of the photometric regions in the single focus mode.

The aforesaid information may include at least information about a focus deviation quantity obtained by the automatic focal point adjustment device. In this case, the light adjustment region determining means included by the calculating means determines a photometry region overlapping the focal point detection region to be the light adjustment region among the photometry region if the focus deviation quantity is equal to or smaller than a predetermined value. If the focus deviation quantity is larger than the predetermined value, the light adjustment region determining means determines the light adjustment region in accordance with each photometry output from a plurality of the photometry regions.

Light emitted from the flashing device and reflected by an object is divided into a plurality of photometry regions by the photometry means and is received. The focal point adjustment information output means transmits information about the focal point adjustment of the automatic focal point adjustment device, while the calculating means calculates the proportion of contribution of each photometry output from the photometry means to the light adjustment in accordance with the information about the focal point adjustment. The light adjustment means controls the light emission to be performed by the flashing device in accordance with the proportion calculated by the calculating means. Therefore, the light emission from the flashing device controlled by the light adjustment means reflects both the information about the focal point adjustment and the photometry output denoting the result of the photometry performed by dividing the light into the photometry regions.

In a case where the information about the focal point adjustment is a focal point adjustment mode of the automatic focal point adjustment device, the light adjustment region determining means determines a substantially central photometry region, which overlaps a focal point detection region, to be the light adjustment region among the photometry regions if the focal point adjustment is a continuous automatic focus mode. If it is a single automatic focus mode, the light adjustment region determining means determines the light adjustment region in accordance with each photometry output from a plurality of the photometric regions. Therefore, in a case where there is a considerable probability that a main object is present in the focal point detection region as in a case of the continuous automatic focus mode, the substantially central region is determined to be the light adjustment region and the photometry output from the light adjustment region is substantially used to adjust light to be emitted at the main flashing.

In a case where the information about the focal point adjustment is the focus deviation quantity obtained by the automatic focal point adjustment device, a photometry region overlapping the focal point detection region is determined to be the light adjustment region among the photometry region if the focus deviation quantity is equal to or smaller than a predetermined value. If the focus deviation quantity is larger than the predetermined value, the light adjustment region is determined in accordance with each photometry output from a plurality of the photometry regions. Therefore, in a case where there is a considerable probability that a main object is present in the focal point detection region as in a case where the focus deviation quantity is equal to or smaller than a predetermined value, this region can be determined to be the light adjustment region.

According to the above-mentioned invention, the proportion of contribution of each photometry output from the photometry means is calculated in accordance with the information about the focal point adjustment of the automatic focal point adjustment device. In accordance with the aforesaid proportion, the light emission from the flashing device is adjusted. Therefore, the photometry region which contains the main object, the focal point of which is adjusted, can be predicted by a certain degree. In accordance with the predicted result, light adjustment can be controlled in such a manner that information about the focal point adjustment and the photometry output obtained by dividing light into photometry regions are reflected. Therefore, even if a main object is present in a region in which a high reflectance object such as a mirror is present or in a region the background of which is positioned faraway, the photometry value of the above-mentioned region is not excluded. Consequently, the light adjustment with respect to a main object can be performed.

The present invention may be applied to an automatic light adjustment device for a camera in which no automatic focal point adjustment device is provided but a focal point detection device is provided so as to display a state of focus point adjustment. In this case, the camera comprises a focal point detection information output means for outputting information about focal point detection obtained by said focal point detection device; and calculating means for calculating a proportion of contribution of each photometric output transmitted from a photometer to light adjustment in accordance with an output from said focal point detection information output means, wherein said light adjustment means control light to be emitted from said flashing device in accordance with said calculated proportion.

In this invention, the focal point detection device may include a focus deviation quantity detection means for detecting a focus deviation quantity from a focusing point. The information about said focal point detection includes at least an information on said focus deviation quantity obtained by said focus deviation quantity detection means. Also in this invention, the calculating means includes a light adjustment region determining means for determining a light adjustment region, which is substantially used to light adjustment control performed by said light adjustment means at the time of said main flashing, among a plurality of said photometry regions. If said focus deviation quantity is smaller than a predetermined value, said light adjustment region determining means determines a photometry region overlapping said focal point detection region to be said light adjustment region among said photometry regions, and if said focus deviation quantity is larger than a predetermined value, said light adjustment region determining means determines a photometry region to be said light adjustment region in accordance with each photometry output from a plurality of said photometry regions.

BRIEF DESCRIPTION OF THE DRAWINGS

FIGS. 12 to 17 show a flow chart which illustrates a calculation routine for determining the light adjustment region and calculating the light adjustment correction quantity; and FIGS. 18 and 19 shows a flow chart for a main flashing operation and a light adjustment control routine.

DETAILED DESCRIPTION OF THE PREFFERED EMBODIMENTS

Figure 1:
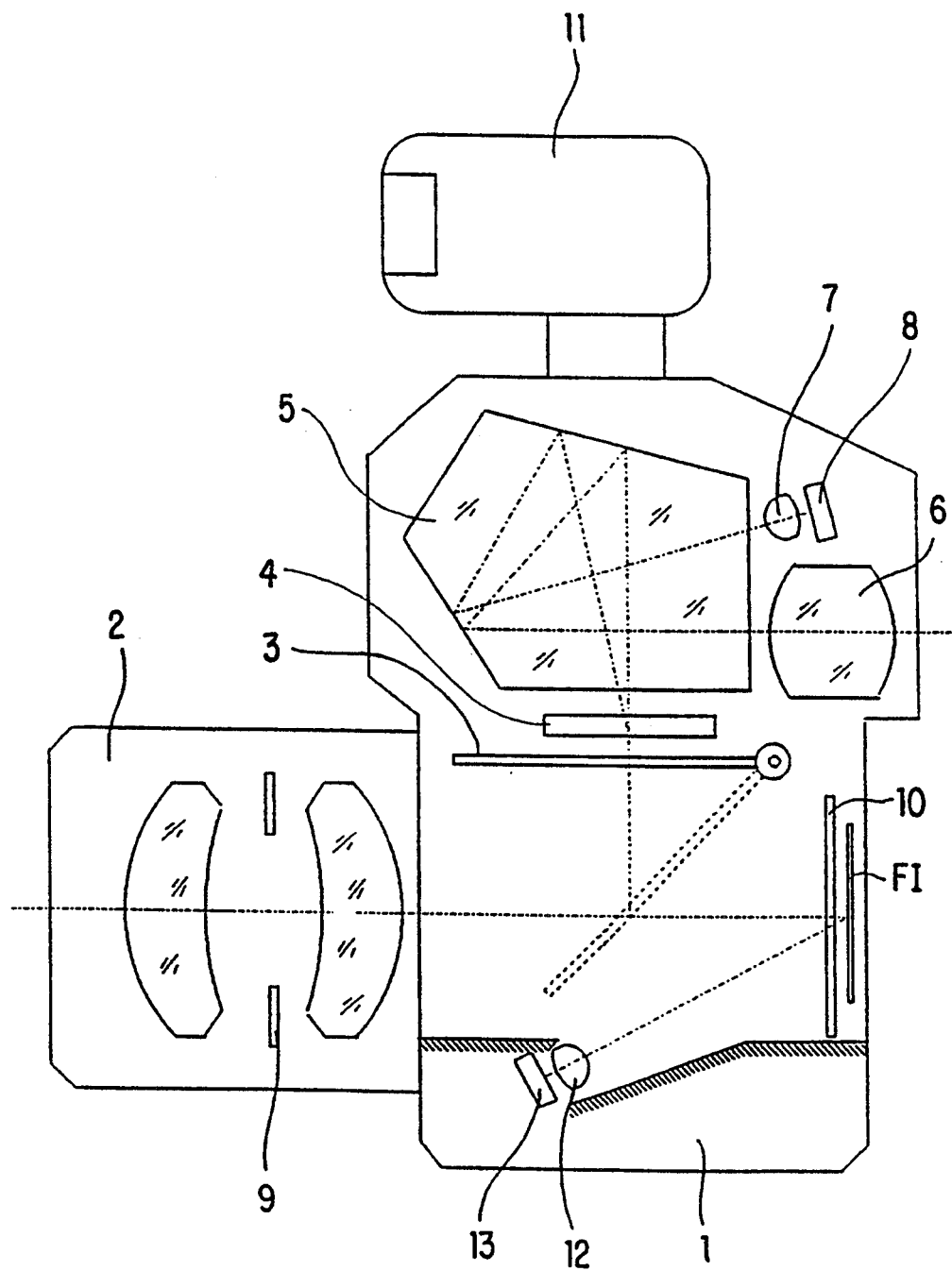
FIG. 1 is a cross sectional view which illustrates a TTL automatic light adjustment camera to which the present invention is applied.

FIG. 1 is a cross sectional view which illustrates a TTL automatic light adjustment camera to which the present invention is applied.

A camera body 1 has a photographic lens 2 and an electronic flashing device 11 to be described later. In a state where a photographic field can be observed through a finder, light beam(stationary light) which has passed through the photographic lens 2 is reflected upwards by a mirror 3 located at the downward position designated by a dashed line. The light beam passes through a screen 4 and a pentagonal prism 5, and then a portion of the beam is introduced into an eyepiece 6, while the residual portion of the beam is introduction through a condenser lens 7 into a photometer device 8 for exposure calculating. At the time of photography, when a shutter release button (described later) is operated, the mirror 3 is moved to the upward position designated by a solid line. A stop 9 is narrowed down and a shutter 10 is opened and then closed. As a result, the beam which has passed through the photographic lens 2 is introduced into a film FI so that the film FI is exposed.

At the time of performing photography with flashing, the electronic flashing device 11 performs main flashing in synchronization with opening of the shutter 10 so that the object is lightened. Light reflected from the object passes through the photographic lens 2 before it reaches the surface of the film FI. A portion of the beams reflected by the surface of the film FI passes through a condenser lens array 12 before it is introduced into a photoreceptor device 13 for light adjustment so that the portion of the beams is received by a photoreceptor device 13. The camera according to this embodiment is able to perform preliminary flashing to be performed prior to main flashing for the purpose of examining the state of the object. The preliminary flashing operation is performed before the shutter 10 is opened. Light emitted at this preliminary flashing operation is reflected by the object and is further reflected by the reflection surface of the shutter 10 before it is received by the light adjustment photoreceptor device 13.

Since the shutter 10 is used as the surface for reflecting the light due to the preliminary flashing, the reflection surface of the shutter 10 is made such as to be capable of reflecting light substantially the same way as the photosensitivity surface of the film FI.

Figure 2:
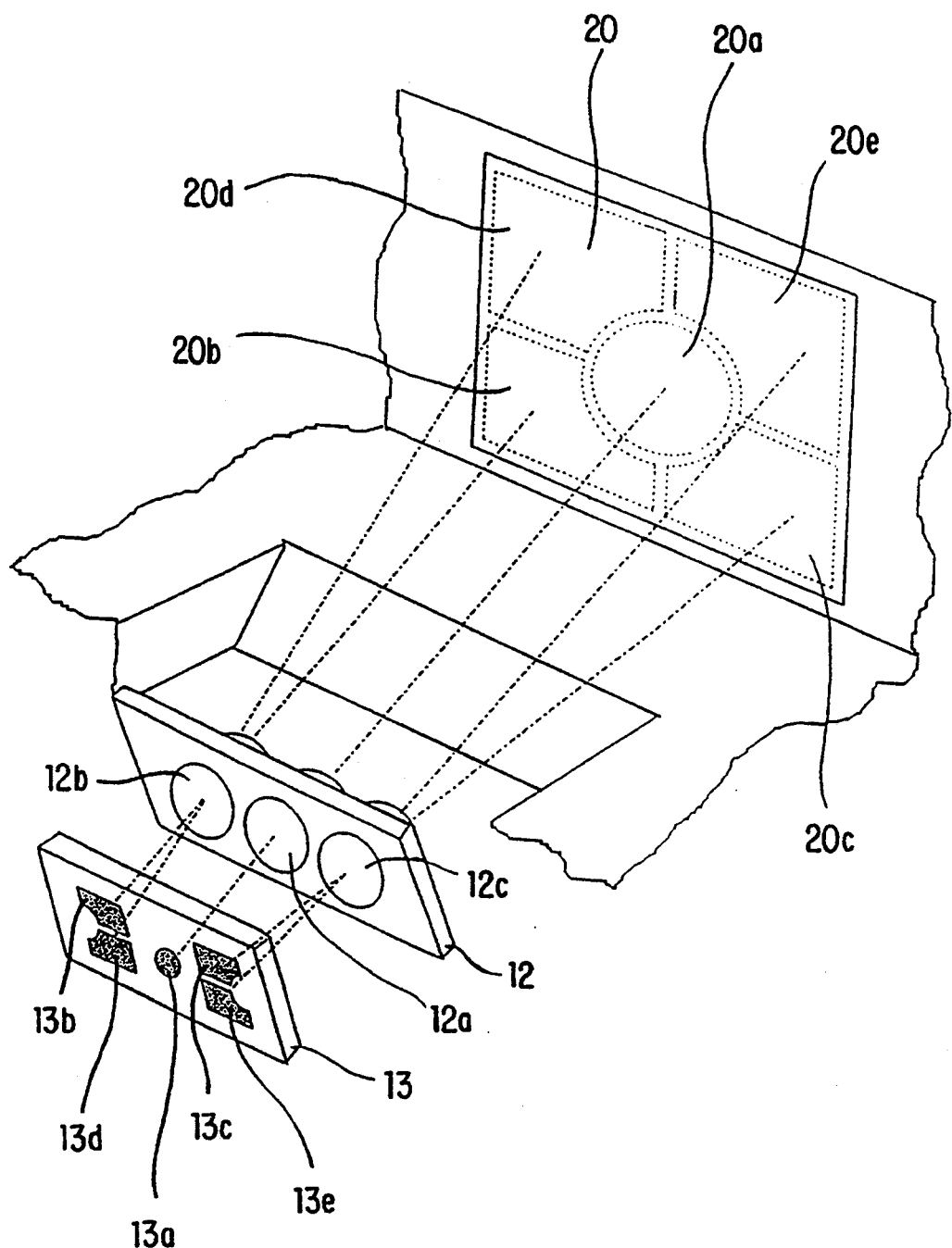
FIG. 2 is a perspective view which illustrates the positional relationship among a condenser lens array, a photoreceptor devices for light adjustment and the film.

As shown in FIG. 2, the photoreceptor device 13 comprises a divisional photoreceptor element 13a which corresponds to a circular photometry region in the central portion of the object field and divisional photoreceptor elements 13b to 13e which correspond to photometry regions in the peripheral portions of the object field in a shape formed by cutting a rectangle by circular arcs, the divisional photoreceptor devices 13a to 13e being disposed on the same plane. The above-mentioned light adjustment photoreceptor device 13 divides the object field into five photometry regions and performs a divisional photometry. The condenser lens array 12 is an optical component having three lens portions 12a to 12c which correspond to right, center and left blocks of the divisional photoreceptor elements 13a to 13e respectively. As shown in FIG. 2, similarly to the object-field, when an exposure region 20 for one photographic frame of the film is divided into 5 regions composed of a region 20a, which is a circular region located at the central portion of the exposure region 20 and regions 20b to 20e formed by dividing the peripheral portion of the exposure region 20 into four regions, the above-mentioned right, center and left blocks composed of the photoreceptor elements 13a to 13e face the right, center and right portions of the film exposure region 20 via the three lens portions 12a to 12c of the condenser lens array 12 as designated by corresponding dashed lines. The divisional photoreceptor elements 13a to 13e are disposed in substantially conjugation with the divisional exposure regions 20a to 20e with respect to the corresponding lens portions 12a to 12c. The divisional exposure regions 20a to 20e respectively measure the brightness of the corresponding five divisional exposure regions 20a to 20e while substantially maintaining the configuration relationship.

Figure 3:
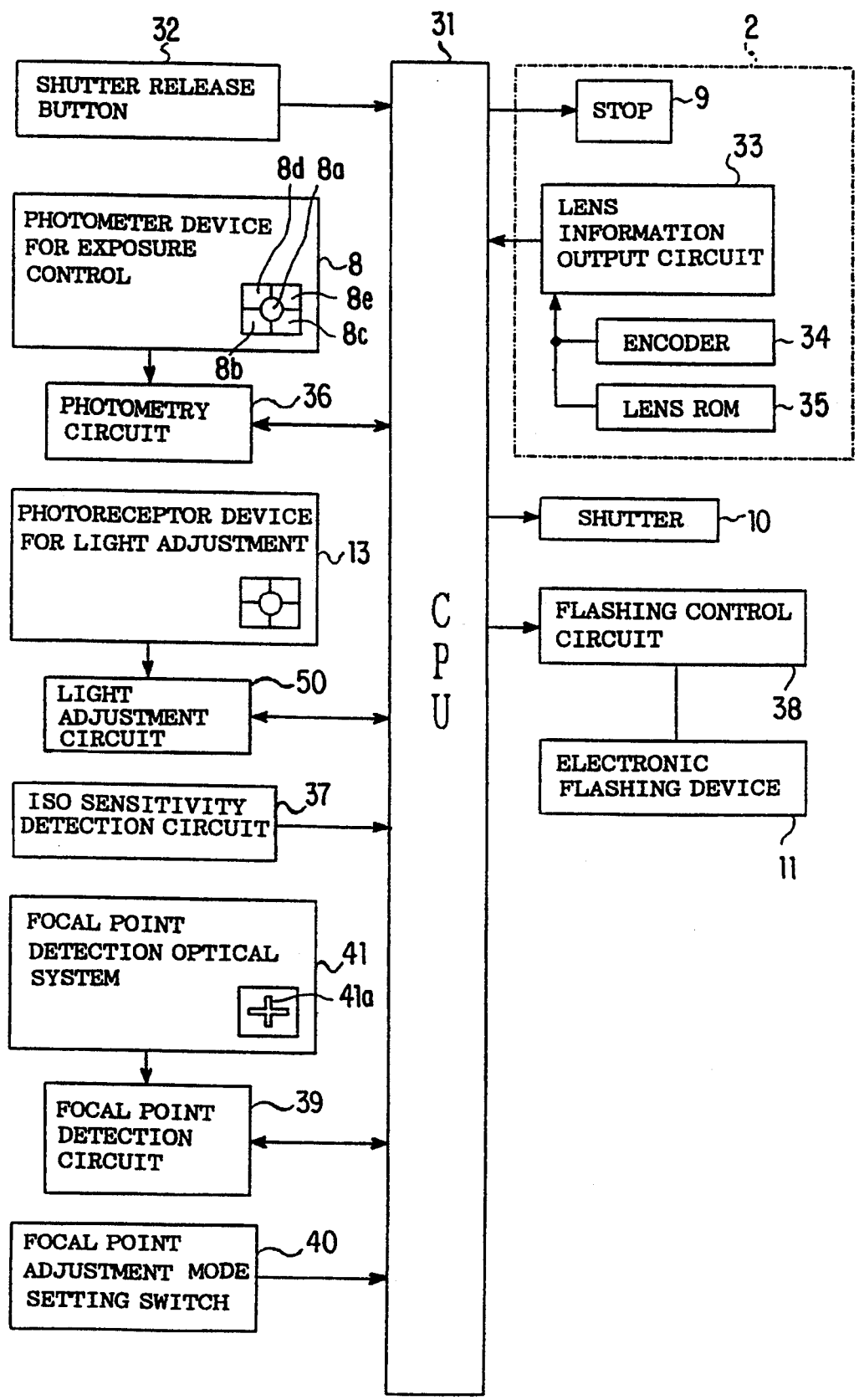
FIG. 3 is a block diagram which illustrates an example of a camera to which an automatic light adjustment device according to the present invention.

FIG. 3 is a block diagram which illustrates the structure of an embodiment of the present invention.

A CPU 31 is composed of a microcomputer and its peripheral elements so as to control the total sequence of the camera. The CPU 31 executes a control program (described later) so as to control and adjust flashing of the electronic flashing device 11. A shutter release button 32 having two steps of strokes (hereinafter called a "first stroke" and a "second stroke") and the shutter 10 are connected to the CPU 31. The stop 9 and a lens information output circuit 33 both in the photographic lens 2 are also connected to the CPU 31. The lens information output circuit 33 transmits, to the camera body 1, information such as object distance X obtained a known in-lens-encoder 34, full-aperture value FO, exit pupil distance PO, focal distance f and object distance error $\Delta X$ generated due to the resolution of the encoder 34, which are all stored in a lens ROM 35.

Connected to the CPU 31 are a photometry circuit 36 for performing photometry operation in response to a photometry signal supplied from the photometer device 8, a light adjustment circuit for performing light adjustment in accordance with photometry outputs from the divisional photoreceptor elements 13a to 13e of the photoreceptor device 13, an ISO sensitivity detection circuit 37 for reading the ISO sensitivity of loaded film FI from a DX code and a flashing control circuit 38 of the electronic flashing device 11. Similarly to the photoreceptor devices 13, photometer device 8 has five divisional photometer devices 8a to 8e which correspond to the photometry regions of the object field.

A focal point detection circuit 39 and a focal point adjustment mode setting switch 40 are connected to the CPU 31. The focal point detection circuit 39 detects focus-deviation quantity $\Delta AF$ of the photographic lens 2 in accordance with information about the focus point detection in a focal point detection region 41a, which is located in the substantially central portion of photographic frame, transmitted from a focal point detection optical system 41 so as to transmit the thus obtained focus-deviation quantity $\Delta AF$ to the CPU 31. The focal point adjustment mode setting switch 40 is a switch for selecting the operation mode of an automatic focusing (AF)device (automatic focal point adjustment device) omitted from illustration. The automatic focusing device of the camera according to this embodiment has three modes composed of a single AF servo mode (hereinafter called an "S-AF mode"), a continuous AF servo mode (hereinafter called a "C-AF mode" or a "tracking mode") and a manual focus mode (hereinafter called an "M mode"). In the "S-AF mode", when the focal point of the photographic lens 2 is focused on the object at the time of the first stroke of the shutter release button 32, the ensuing focal point adjustment operation is stopped, and the release of the shutter 10 is inhibited during focus adjustment operation. In the "C-AF mode", the focal point of photographic lens 2 is tracked to follow a moving object during an operation of the first stroke of the shutter release button 32. In the "M mode", the focal point adjustment of the photographic lens is manually performed.

Figure 4:
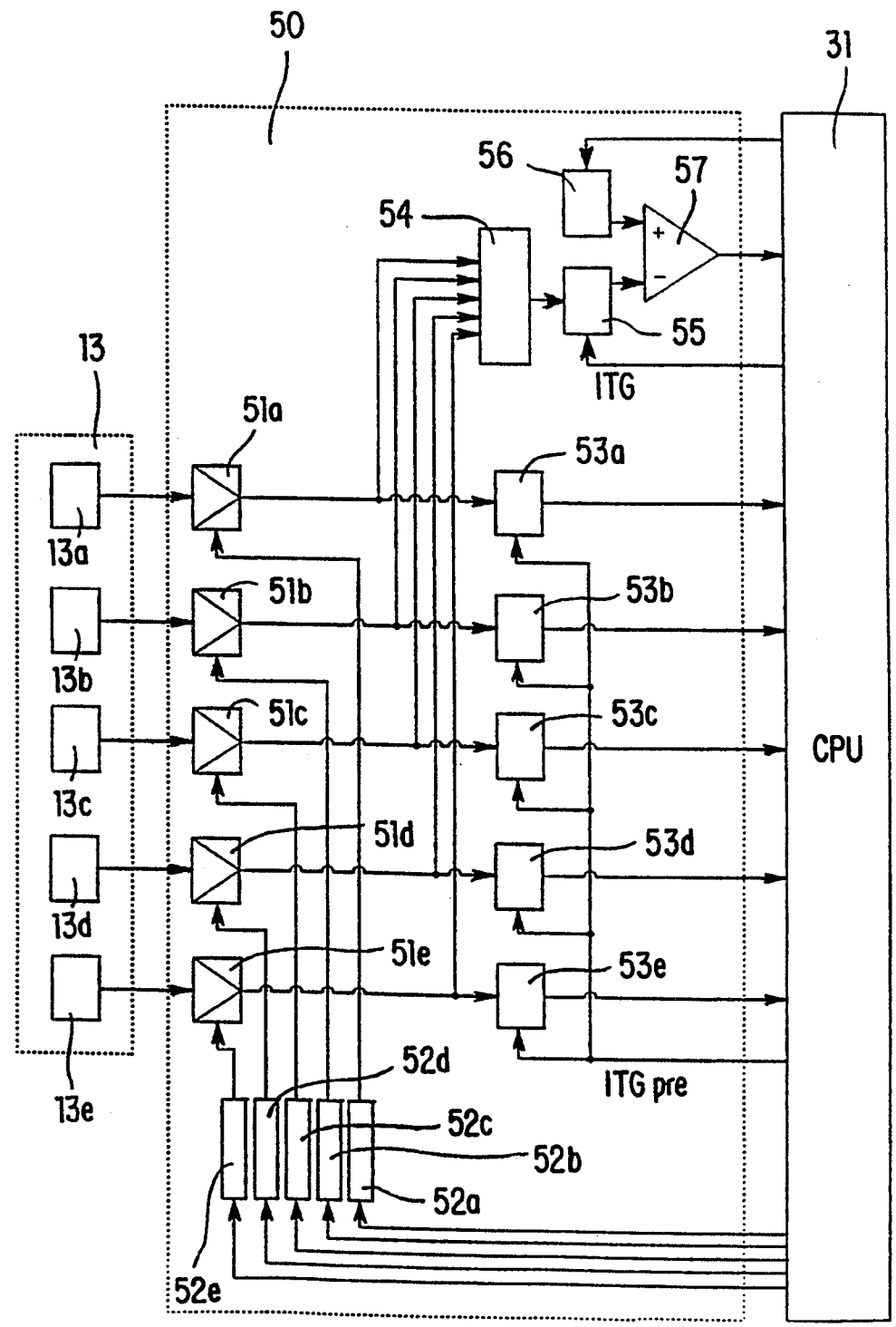
FIG. 4 is a block diagram which illustrates the detailed structure of a light adjustment circuit.

FIG. 4 is a block diagram which illustrates a light adjustment circuit 50.

The light adjustment circuit 50 comprises amplifiers 51a to 51e for amplifying photometry signals transmitted from the divisional photoreceptor elements 13a to 13e. The light adjustment circuit 50 further comprises gain setters 52a to 52e for converting amplification ratios instructed by the CPU 31 into analog signals so as to set the gains of the amplifiers 51a to 51e in accordance with the above-mentioned amplification ratios. The light adjustment circuit 50 further comprises integrating circuits 53a to 53e for integrating, by time, the outputs from the amplifiers 51a to 51e at the time of the preliminary flashing operation, the integration being made in response to a command issued from the CPU 31. The light adjustment circuit 50 further comprises an adder circuit 54 for adding the outputs from the amplifiers 51a to 51e at the time of the main flashing operation. The light adjustment circuit 50 further comprises an integrating circuit 55 for integrating, by time, the result of the addition made by the adder circuit 54 by time in response to a command issued from the CPU 31. The light adjustment circuit 50 further comprises a conversion circuit 56 for converting a light adjustment level (described later) previously stored in the CPU 31 into an analog signal. The light adjustment circuit 50 further comprises a comparator 57 for subjecting the converted light adjustment level and an output from the integrating circuit 55 into comparison so as to transmit a flash-stop signal to the CPU 31 when the output from the integrating circuit 55 is raised to the light adjustment level.

The light adjustment operation performed by the CPU 31 will now be described with reference to flow charts shown in FIGS. 5 to 19.

Figure 5:
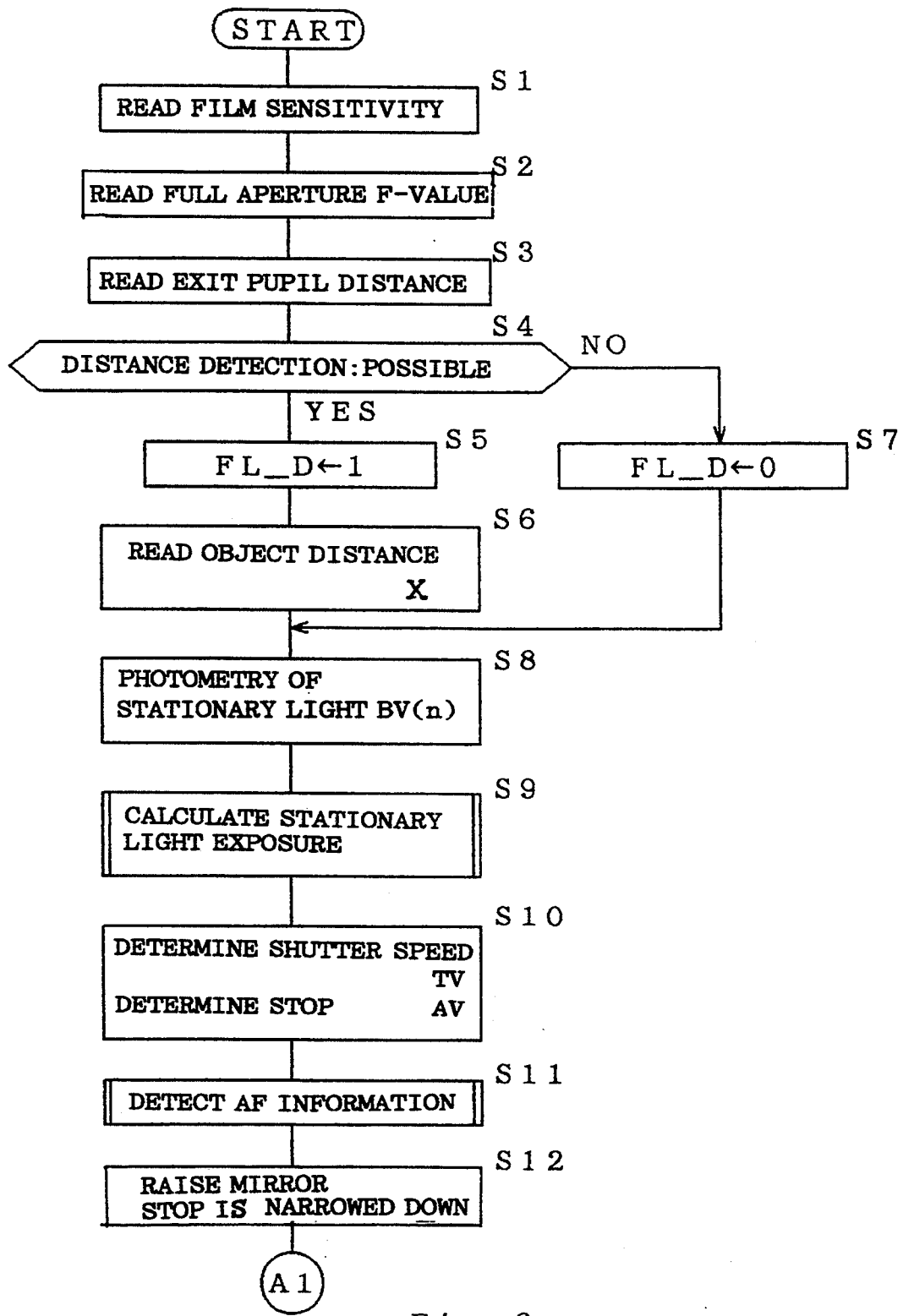
FIGS. 5 and 6 show a flow chart of an example of a light adjustment control main program.
Figure 6:
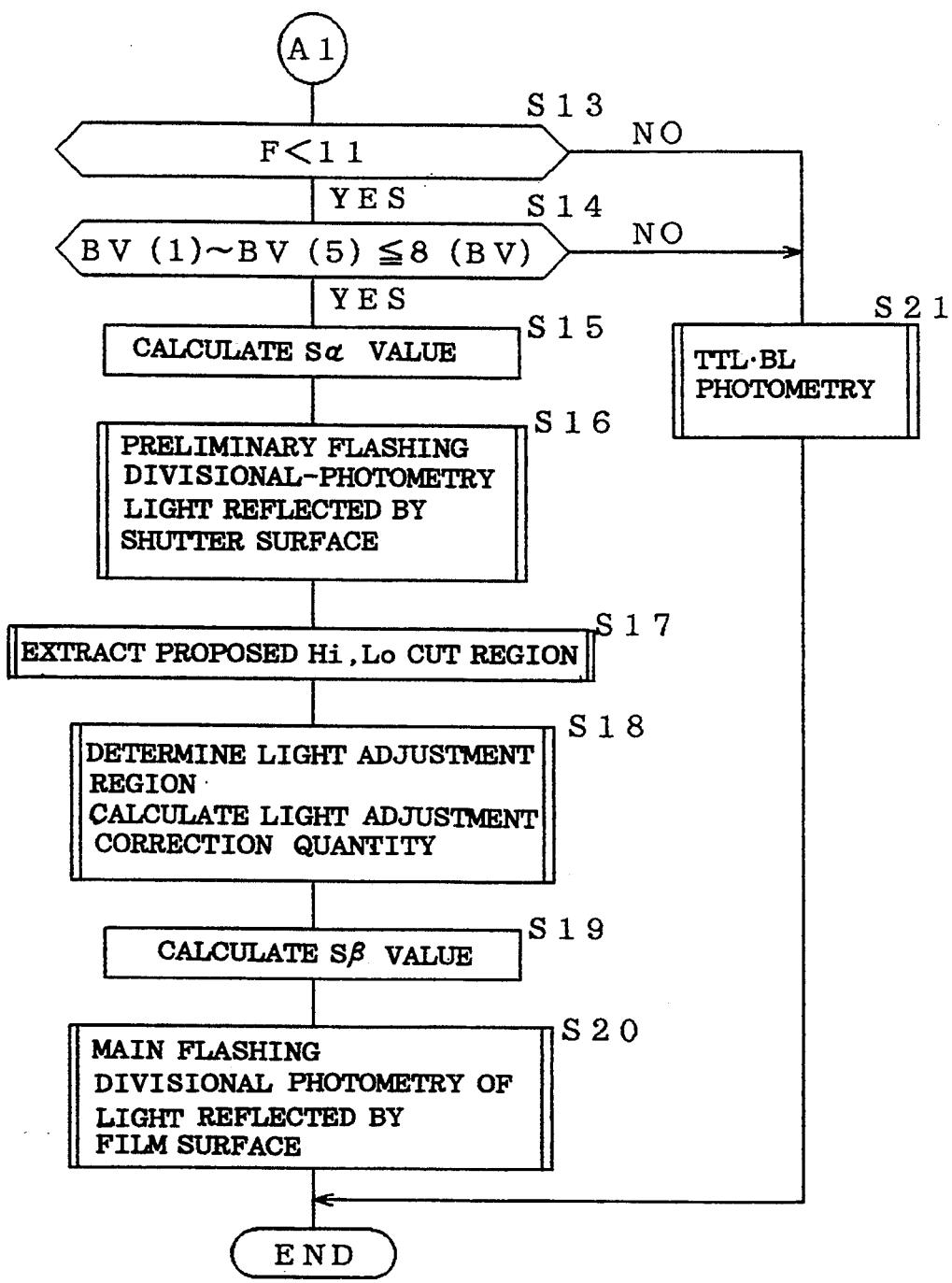

FIGS. 5 and 6 a flow chart showing a main control program. The CPU 31 starts execution of the program shown in FIGS. 5 and 6 when the shutter release button 32 is depressed to the second stroke.

In step S1, the ISO sensitivity SV of the loaded film FI is read through the ISO sensitivity detection circuit 37. In step S2, the full aperture value OF is read through the lens information output circuit 33 of the photographic lens 2. In step S3, the exit pupil distance PO is read through the lens information output circuit 30.

In step S4, a judgement is made as to whether or not the object distance X can be detected. If the object distance X can be detected, the flow proceeds to step S5 in which "1" is set to flag FL_D. In next step S6, the object distance X is read. If the object distance X cannot be detected, the flow proceeds to step S7 in which "0" is set to flag FL_D. For example, if the photographic lens 2 has the built-in encoder 34 for distance detection, it is considered that the object distance can be detected. If the photographic lens 2 has not built-in encoder 34, it is considered that the object distance cannot be detected. The object distance X according to this embodiment is a value of the position of the lens moved by the automatic focal point adjustment device (omitted from illustration) when, for example, the shutter release button 32 is depressed to the first stroke.

In step S8, photometry of the stationary light except for reflected light emitted from the flashing device 11 is performed. That is, the outputs from the divisional photometer elements 8a to 8e are received by the photometric circuit 36. The outputs received by the photometric circuit 36 are then logarithmically compressed to read brightness value BV(n) (n=1 to 5) corresponding to each photometric region, respectively. The values of n (n=1 to 5) to be described hereinafter correspond to the five divisional photometer elements 8a to 8e or the five divisional photoreceptor elements 13a to 13e. In step S9, a stationary light exposure BVans is calculated from each of the read brightness value BV (n) and the ISO sensitivity SV. The above-mentioned calculation is performed by, for example, a method shown in FIG. 7 of Japanese Patent Laid-Open No. 1-285925 filed by the applicant of the present invention. In step S10, shutter speed TV and aperture value AV are determined from the calculated stationary light exposure value BVans according to a known program graph.

In step S11, information relating the focal point adjustment is detected. According to this embodiment, information relating the focal point adjustment represents a focal point adjustment mode, including the C-AF mode and the S-AF mode in each of which the focal point adjustment is performed automatically and the M mode in which the focal point adjustment is performed manually, and a focused state representing the degree of the deviation of the focal point to be described later.

In step S12, the mirror 3 is raised to the upward position and as well as the stop 9 is narrowed down to the aperture value AV determined in the above-mentioned step S10. Then, the flow proceeds to steps S13 and S14 shown in FIG. 6 in which whether or not the preliminary flashing operation is performed is determined.

In step S13, a judgement is made as to whether or not the aperture value AV determined in the above-mentioned step is smaller than a predetermined value (according to this embodiment, a F-value of 11). If it is smaller than the predetermined value, the flow proceeds to step S14. If it is equal to or larger than the predetermined value, the flow proceeds to step S21 because it is probable that the preliminary flashing operation is substantially unuseful due to a small quantity of light emitted from the flashing device 11. In step S14, a judgement is made as to whether or not each of the brightness BV (1) to (5) of the stationary light detected in the above-mentioned step S8 is equal to or smaller than a predetermined value (which is 8BV according to this embodiment). If all of the brightness values are smaller than the predetermined value, the flow proceeds to step S15. If anyone of the brightness is larger than the predetermined value, the flow proceeds to step S21 because stationary light is too bright for a quantity of light of the preliminary flashing. In step S21, the preliminary flashing is not performed, but TTL-BL light adjustment is performed. Thus, the program is ended. The TTL-BL light adjustment has been disclosed in Japanese Patent Laid-Open No. 63-83713 made by the applicant of the present invention and therefore its description is omitted here.

In next step S15, correction coefficients Sα(n) are calculated in accordance with the following equations. Each of the correction coefficients Sα(n) corresponds to each of the photometry regions of the photographic lens 2.

$$\begin{aligned} S\alpha\ (1) &= 1 \\ S\alpha\ (2) &= 1 - (1.2 \times 10^{-3}) \cdot PO \\ S\alpha\ (3) &= 1 - (1.2 \times 10^{-3}) \cdot PO \\ S\alpha\ (4) &= 1 + (1.7 \times 10^{-3}) \cdot PO \\ S\alpha\ (5) &= 1 + (1.7 \times 10^{-3}) \cdot PO \end{aligned} \quad (1)$$

The above-mentioned correction coefficients Sα (n) are used to correct the result of light reflected by the reflection surface of the shutter in order to evaluate the photometry output from all of the divisional photoreceptor elements 13a to 13e under the same conditions because the conditions for the divisional photoreceptor devices 13a to 13e to receive light differ from each other depending upon the exit pupil distance PO of the photographic lens 2.

In step S16, the preliminary flashing operation is performed so as to perform divisional photometry on the light reflected by the shutter curtain surface. In next step S17, photometry regions, which can be the photometry regions which are not substantially used at the time of controlling the light adjustment operation, are extracted among the divided photometry regions 13a to 13e. The above-mentioned extracting process is called an extraction of cut region proposition. In step S18, photometry regions, which can be substantially used at the time of controlling the light adjustment, are determined and a light adjustment correction quantity $\Delta Y$ is also determined. Hereinafter, photometry regions thus determined are called "light adjustment regions". The process to be performed in steps S16 to S18 will be described later with reference to FIGS. 8 to 17. In step S19, correction coefficients $S\beta$ (n) for each photometry region of the photographic lens 2 are calculated. An assumption is made here that $S\beta$ (n)=$S\alpha$ (n). In step S20, the shutter 10 is fully opened and the main flashing operation is performed. Furthermore, divisional photometry is performed on the light reflected from the surface of the film and the light adjustment operation is performed. These operations will be described later with reference to FIGS. 18 and 19.

Figure 7:
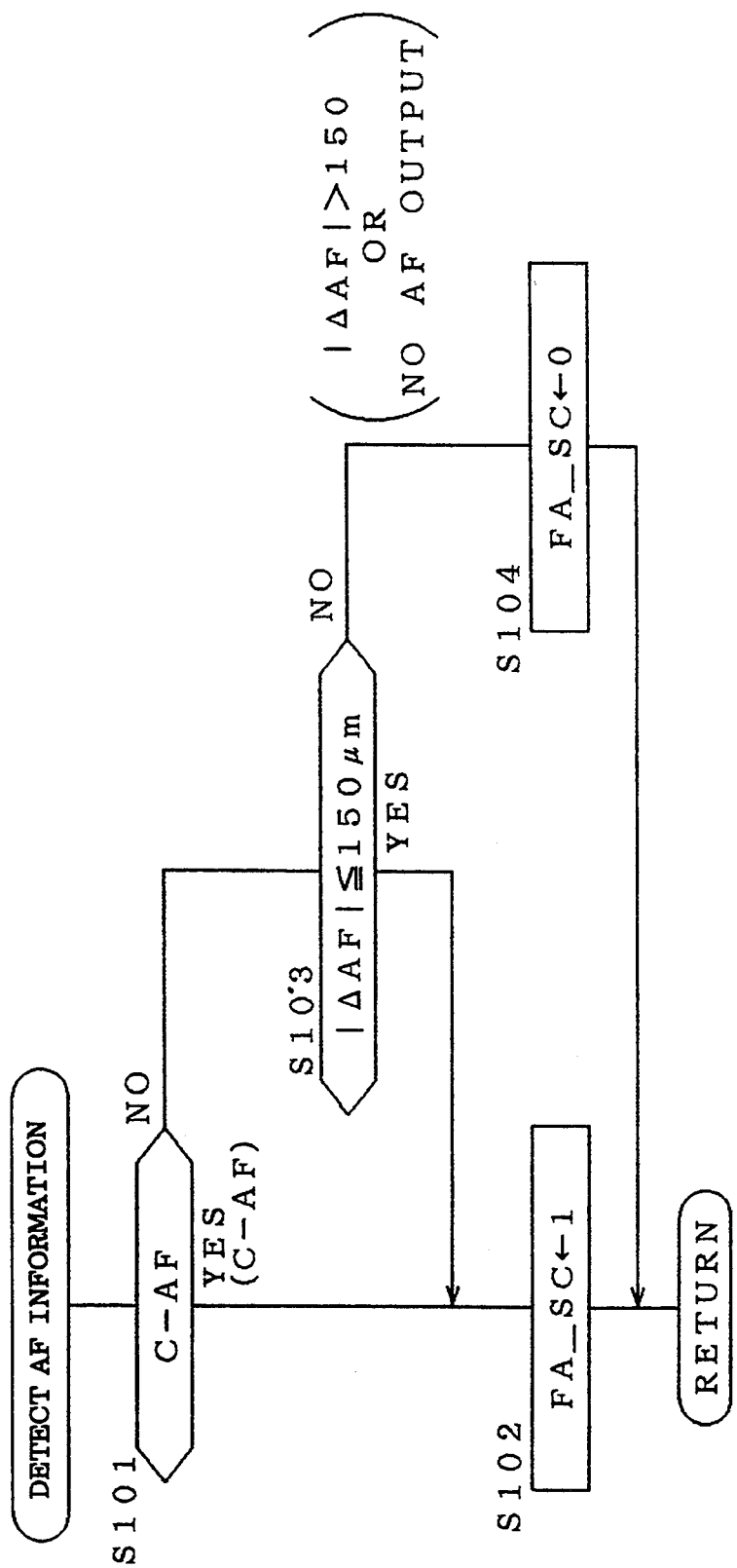
FIG. 7 is a flow chart which illustrates an example of an automatic focus information detection routine.

FIG. 7 is a flow chart showing an automatic focusing information detection process to be performed in step S11 shown in FIG. 5.

In step S101, the focal point adjustment mode is discriminated. In a case where the focal point adjustment mode setting switch 40 is set to the C-AF mode, it is considered that the main object is positioned in the focal point detection region of the photographic frame and therefore the flow proceeds to step S102 in which flag FA_SC is set to "1". In a case where the focal point adjustment mode setting switch 40 is set to the S-AF mode or the M mode, it is not clear as to whether or not the main object is positioned in the focal point detection region. Thus, the flow proceeds to step S103 in which a judgement is made as to whether or not the absolute value $|\Delta AF|$ of the focus deviation quantity $\Delta AF$ immediately before the exposure of photographic frame is equal to or smaller than a predetermined value (150 $\mu$m according to this embodiment). If $|\Delta AF|$ is equal to or smaller than 150 $\mu$m, it is considered that the main object is positioned in the focal point detection region of the photography frame and the flow proceeds to step S102. If $|\Delta AF|$ is larger than 150 mm, it is considered that it is not clear whether or not the main object is positioned in the focal point detection region and the flow proceeds to step S104 in which flag FA_SC is reset to zero. Then, the flow returns to the main program.

Figure 8:
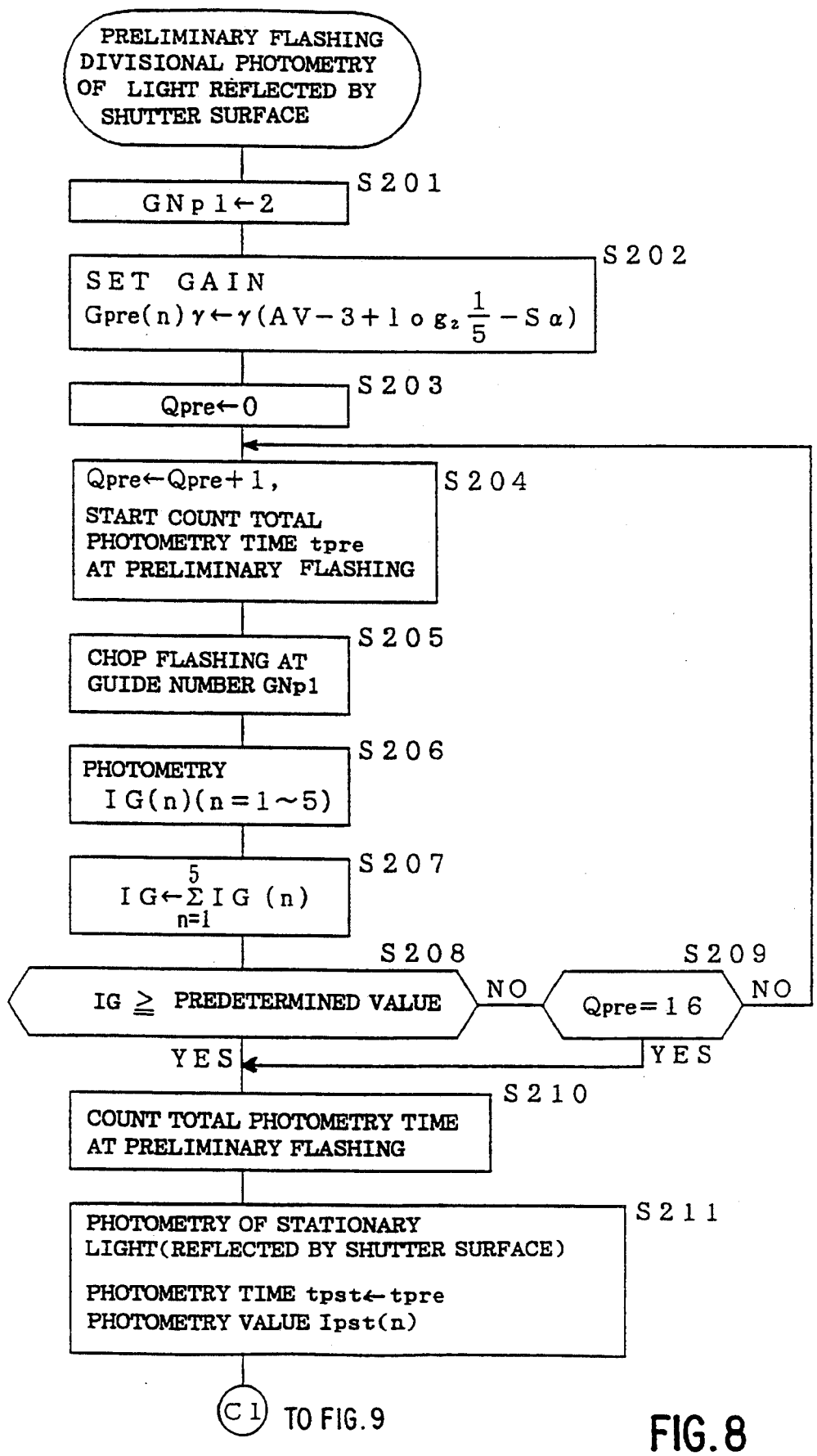
FIGS. 8 and 9 show a flow chart which illustrates a photometry processing routine at the time of preliminary flashing.
Figure 9:
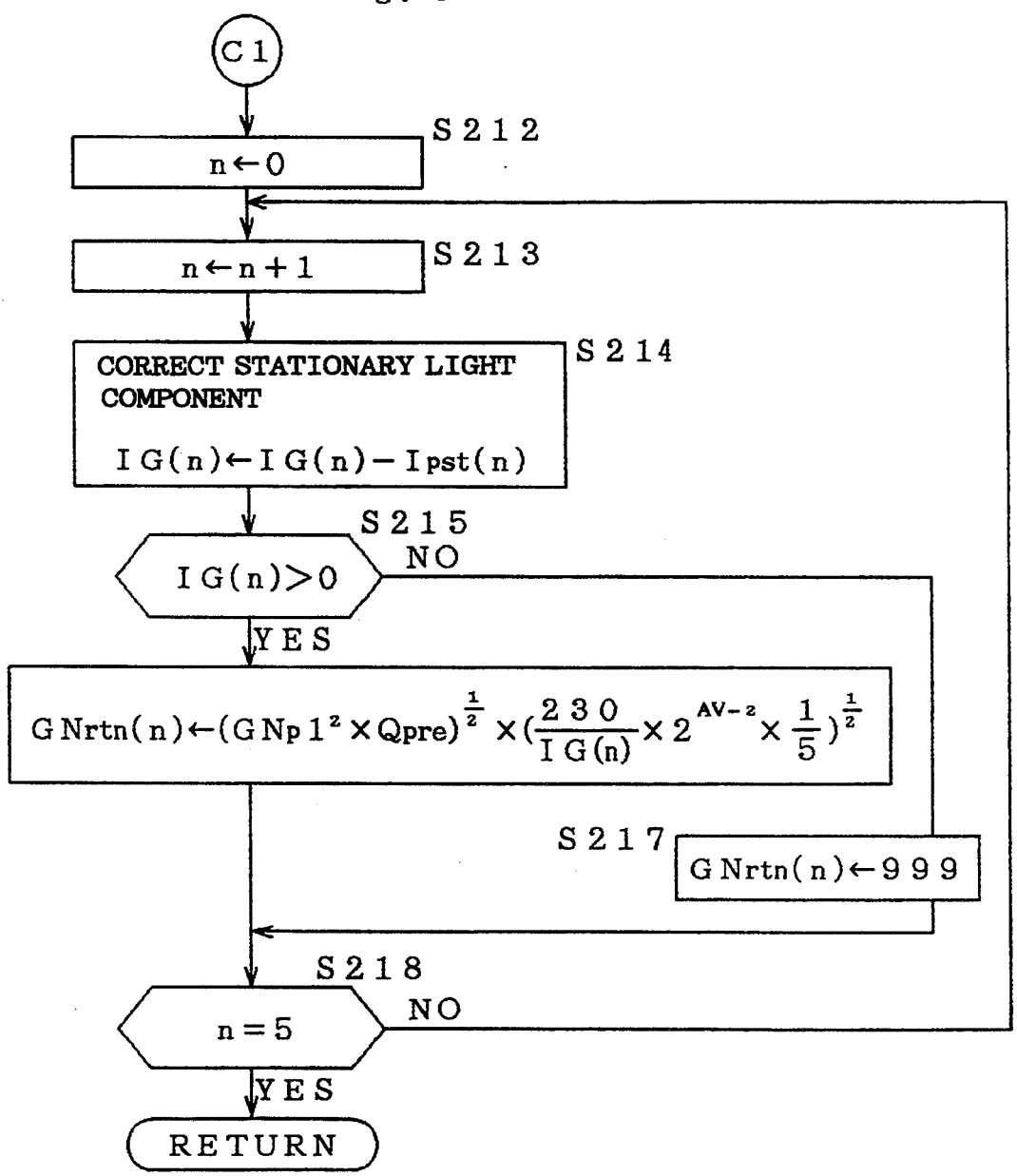

FIGS. 8 and 9 shows a flow chart which illustrates the preliminary flashing process to be performed in step S16 shown in FIG. 6.

In step S201, guide number GNp1 for one preliminary flashing operation is made to be "2". Hereinafter, flashing with guide number "2" is intermittently performed by a plurality times at the time of the preliminary flashing operation and one time of flashing is called a "chop flashing". In step S202, the gain Gpre (n) to be given to the gain setters 52a to 52e of the light adjustment circuit 50 are calculated using the above-mentioned lens correction coefficients $S\alpha$ (n) in accordance with the following equation:

$$Gpre\ (n) = \gamma(AV - 3 + log_2(1/5) - S\alpha(n)) \quad (2)$$

where $\gamma$ is a constant. In step S203, number of times Qpre of the chop flashing is reset to zero. In next step S204, the number of times Qpre is incremented by one and a timer for counting the total photometry time tpre at the time of the preliminary flashing operation is started.

In step S205, the chop flashing operation is performed with the guide number GNp1 (GNp1=2). In next step S206, a photometry is performed on the reflected light from the object due to the light emitted by the chop flashing operation. That is, the beam emitted by the chop flashing operation is reflected from the object before they pass through the photographic lens 2 so that it forms a primary image on the reflection surface of the shutter 10. The above-mentioned primary image is divided into 5 sections and each of the divided image passes through the condenser lens array 12 shown in FIG. 2 before they are respectively received by the five divisional photoreceptor elements 13a and 13e. The divisional photoreceptor elements 13a to 13e respectively transmits photometry output signals according to the quantity of received light to the amplifiers 51a to 51e of the light adjustment circuit 50. The amplifier 51a to 51e respectively amplify the photometry signals with the gain Gpre (n) calculated and set to the gain setters 52a to 52e in the above-mentioned step S202 so as to transmit the amplification signals to the integrating circuits 53a to 53e. The CPU 31 transmits operation signals to the integrating circuits 53a to 53e, and the integrating circuits 53a to 53e time-integrate the amplified photometry signals in response to the above-mentioned operation signal so as to transmit the result of the integrating operation as integration value IG (n) (n=1 to 5) to the CPU 31. The above-described integration value IG (n) includes the components generated due to stationary light as well as the components generated due to the preliminary flashing performed by the flashing device 11.

In step S207, the sum total value IG of the integration value IG (n) of the five photometry signals is calculated. In next step S208, whether or not the sum total value IG of the photometry signals is equal to or larger than a predetermined value is judged. If it is judged to be equal to or larger than the predetermined value, the flow proceeds to step S210. If it is judged to be less than the predetermined value, the flow proceeds to step S209 in which a judgement is made as to whether or not the times Qpre of the chop flashing operation reaches a predetermined value (which is 16 according to this embodiment). It is judged in step S209 that the times Qpre of the chop flashing operation reaches 16, the flow proceeds to step S210. If it is judged in step S209 that the Qpre is less than 16, the flow returns to step S204 and the above-described processes are repeated. In step S210, the timer for counting the total photometry time tpre taken to perform a photometry at the time of the preliminary flashing operation is stopped and the total photometry time tpre is detected. In step S211, a photometry on the stationary light is performed by the same optical system as that used to measure the preliminary flash so as to detect photometry value Ipst (n). The photometry time tpst is assumed to be the same time as the total photometry time tpre taken to perform a photometry on the preliminary flashing.

Then, steps S212 to S218 of a program shown in FIG. 9 are sequentially executed. In these steps, the stationary light component is excluded from the five photometry signals corresponding to the regions n=1 to 5 and as well as the guide number GNrtn of the photometry regions at the time of the preliminary flashing operation is calculated.

In step S212, region number n is reset to zero, and region number n is incremented by one in step S213. In step S214, correction is performed by subtracting the stationary light component Ipst (n) from the integration value IG (n) of the photometry signal including both of the preliminary flashing component generated by the flashing device 11 and the stationary light component. In step S215, a judgement is made as to whether or not the corrected integration value IG (n) of the photometry signal is positive. If the value IG(n) is positive, the flow proceeds to step S216. If the value IG(n) is zero or negative, the flow proceeds to step S217. In step S216, guide number GNrtn (n) denoting the degree of return of light emitted at the time of the preliminary flashing operation is calculated in accordance with the following equation:

$$GNrtn\ (n) = (GNp1^2 \times Qpre)^{\frac{1}{2}} \times [\{230/IG\ (n)\} \times 2^{AV-2} \times (1/5)]^{\frac{1}{2}} \quad (3)$$

GNrtn (n) is a value obtained by multiplying aperture value F by the object distance X in a case where the object present in each photometry region has a standard reflectance. That is, it can be considered that an object having a standard reflectance is positioned at a position of the object distance X in the photometric region expressed by $F \times X = GNrtn\ (n)$, that an object having reflectance higher than the standard reflectance is positioned at a position of the object distance X in the photometric region expressed by $F \times X > GNrtn(n)$ and that an object having a reflectance lower than the standard reflectance is positioned at a position of the object distance X in the photometric region expressed by $F \times X < GNrtn\ (n)$. That is, GNrtn (n) of the object present at the same object distance X is small in inverse proportion to the reflectance.

In a case where integration value IG (n) of the photometry signal after the correction has been performed by excluding the stationary light component is not positive, the flow proceeds to step S217 in which a very large value (which can be regarded as infinite), i.e. 999 according to this embodiment, is set to GNrtn (n) and the flow proceeds to S218. That is, the photometry value at the time of the preliminary flashing operation is made to be 0 or a small positive value. In step S218, whether or not all of the regions have been subjected to the above-mentioned process is judged. If it has been completed, the flow returns to the main program. If it has been incompleted, the flow returns to step S213 in which the above-mentioned processes are repeated.

Figure 10:
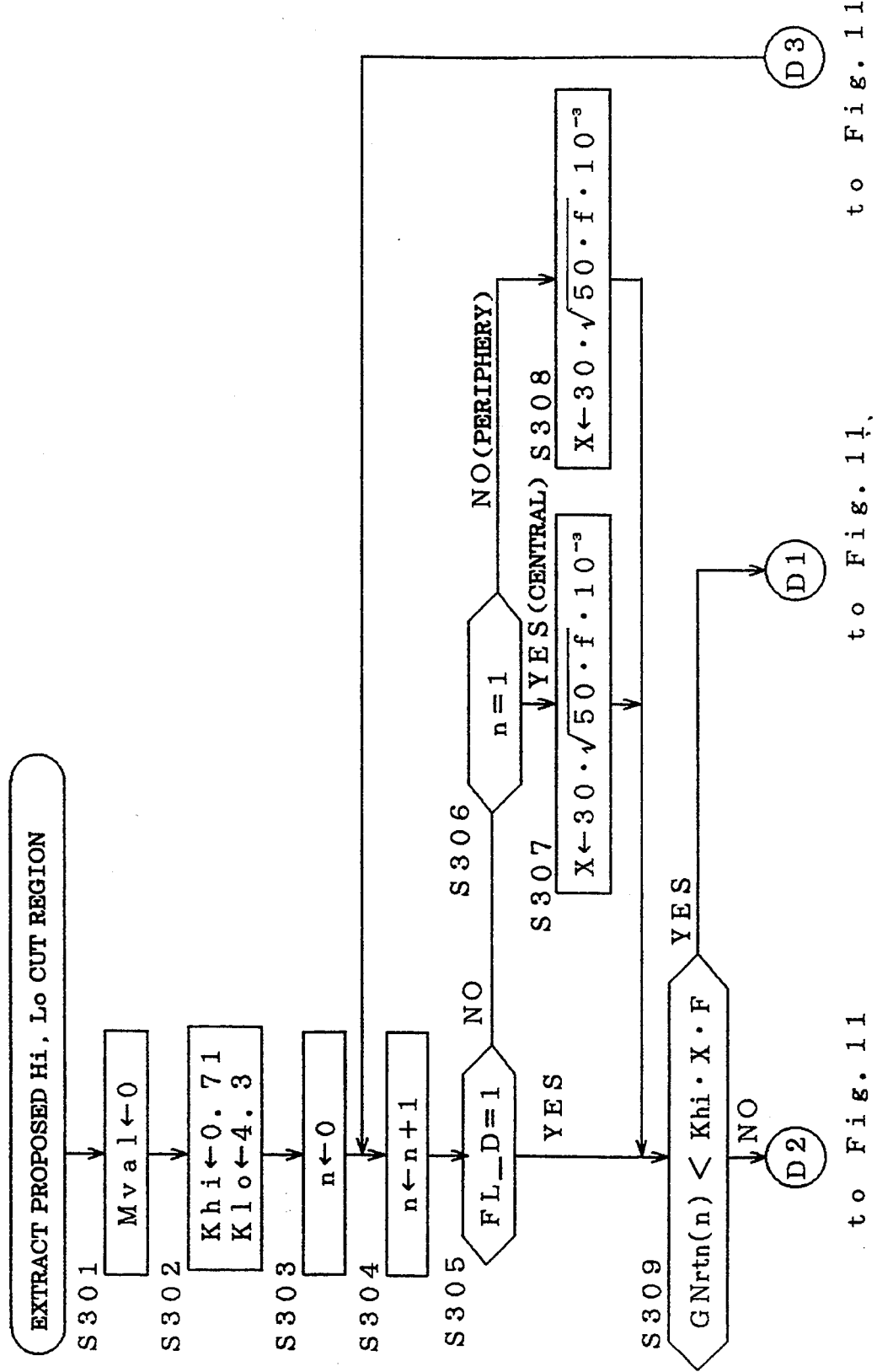
FIGS. 10 and 11 show a flow chart which illustrates a routine for extracting as a Hi and a Lo cut regions.
Figure 11:
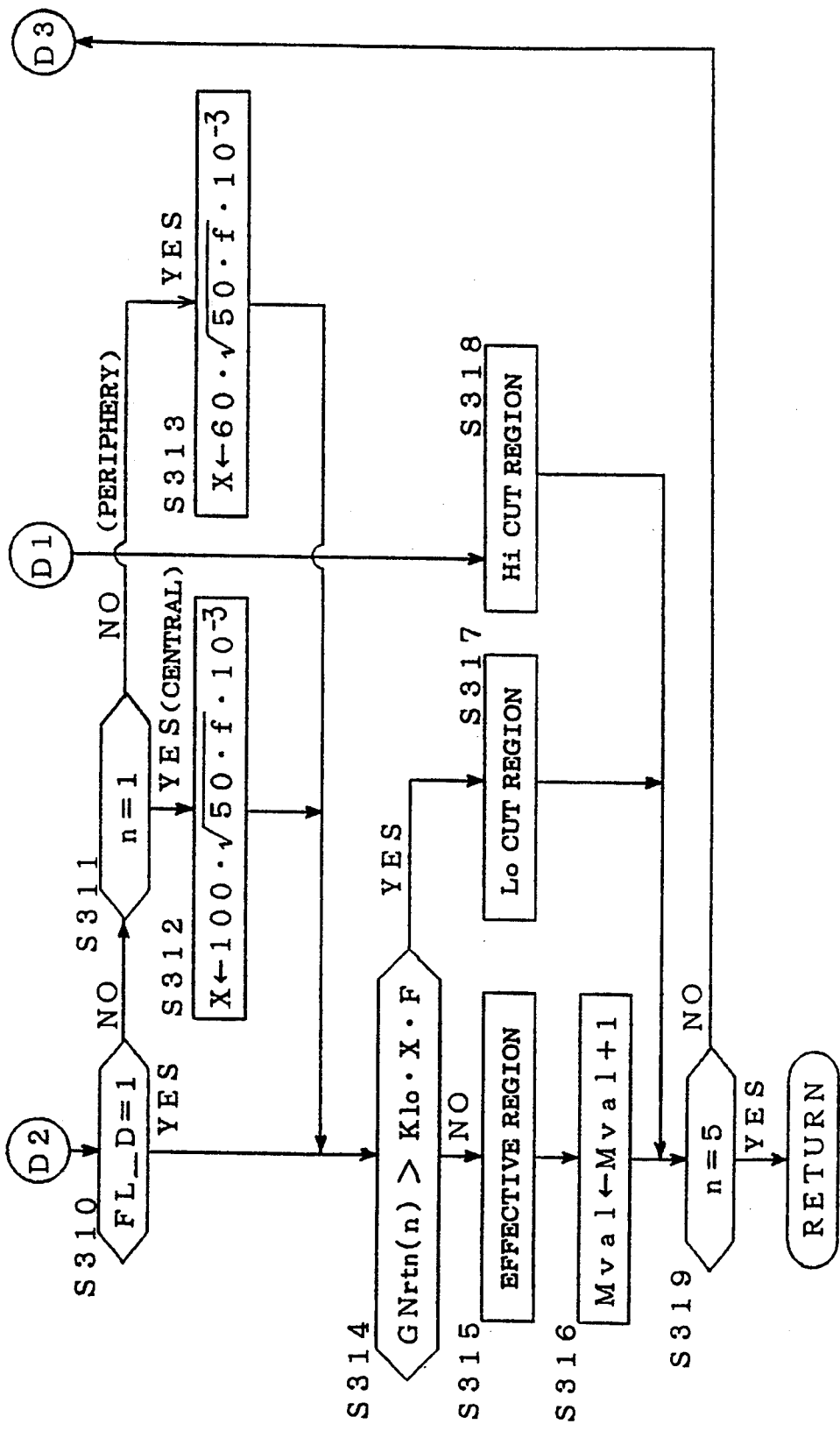

FIGS. 10 and 11 shows a flow chart of proposed Hi, Lo cut regions extraction process in step S17 shown in FIG. 6.

In step S301, number of an effective region Mval in which the photometry output can be substantially utilized in a light adjustment operation (described later) is reset to zero and the flow proceeds to step S302 in which "0.71" is set to coefficient Khi with which the Hi cut region is determined and "4.3" is set to coefficient Klo with which the Lo cut region is determined. The aforesaid values of the coefficients Khi and Klo for determination are described as an example and therefore the present invention is not limited to these values. In step S303, region number n is reset to zero, and in step S304, the region number n is incremented by one. In step S305, a judgement is made as to whether or not flag FL_D is 1, that is, whether or not the object distance X has been detected. If the object distance X has been detected, the flow proceeds to step S309. If a negative answer is obtained in step S309, the flow proceeds to step S306. In step S306, whether or not region number n is "1" (hereinafter region "1" is the central region of the photographic frame) is judged. If the region number n is 1, that is, if the region is the central region of the frame, the flow proceeds to step S307. If the judgement is negative (in a case where the region is the peripheral region of the frame), the flow proceeds to step S308. In step S307, a value obtained by the following equation is set to the object distance X (unit: m):

$$X = 30 \times (5033\ f)^{\frac{1}{2}} \times 10^{-3} \quad (4)$$

where f is a focal distance (unit: mm) of the photographic lens 2. For example, when f=50 mm, x=1.5 m. If the flow proceeds to step S308, a value obtained by the following equation is set to the object distance X because the region expressed by the region number n is not the central region of the frame:

$$X = 60 \times (50 \times f)^{\frac{1}{2}} \times 10^{-3} \quad (5)$$

In step S309, a judgement is made as to whether or not guide number GNrtn calculated in the above-mentioned step S216 is smaller than $Khi \times X \times F$. If the judgement is affirmative, the flow proceeds to step S318 shown in FIG. 11. If the judgement is negated, the flow proceeds to step S310 shown in FIG. 11. In step S138 shown in FIG. 11, a judgement is made that a high reflectance object such as a gold-leafed folding screen or a mirror is positioned in the region expressed by the region number n, or the object (which is not the main object) is positioned nearer than the object distance X, and this region is extracted, for the time being, as the area which can be the Hi cut region. Although the object distance X cannot be detected, it is considered that a high reflectance object is present if the guide number GNrtn (n) is smaller than $Khi \times X \times F$ as a result of the judgement in step S309 by using the object distance X set in step S307 or step S308. This region is also extracted, for the time being, as the region which can be the Hi cut region. The object distance X in step S307 is made to be larger than the object distance X in step S308. The reason for this lies in that, since it is considerably probable that a main object is present in the central region, the central region is made to be a region which cannot be easily extracted as the region which can be the Hi cut region as compared with the peripheral regions for the purpose of preventing a fact that the main object can be easily cut in the central region.

In step S310 shown in FIG. 11, whether or not flag FL_D is "1" is judged. If FL_D is "1", the flow proceeds to step S314. If FL_D is "0", the flow proceeds to step S311 in which a judgment is made as to whether or not the region number n is "1". If n=1, the flow proceeds to step S312 in which a value obtained by the following equation is set to the object distance X:

$$X = 100 \times (50 \times f)^{\frac{1}{2}} \times 10^{-3} \quad (6)$$

If n is not "1", the flow proceeds to step S313 in which a value obtained from the following equation is set to the object distance X:

$$X = 60 \times (50 \times f)^{\frac{1}{2}} \times 10^{-3} \quad (7)$$

In step S314, a judgement is made as to whether or not the guide number GNrtn (n) calculated in the above-mentioned step S126 is larger than $Klo \times X \times F$. If the judgement is affirmative, the flow proceeds to step S317. If the judgement is negated, the flow proceeds to step S315. In step S317, for the time being, the outstanding region is extracted as a region which can be the Lo cut region, because it is considered that a low reflectance object is present (for example, in a case where a background is positioned far away) in the region which can be the Lo cut region. Although the object distance X cannot be detected, it is considered that a low reflectance object is present if the guide number GNrtn (n) is larger than $Klo \times X \times F$ as a result of a judgement in step S314 by using the object distance X set in step S312 or step S313. This region is also extracted as the region which can be the Lo cut region. The object distance X in step S312 is made to be larger than the object distance in step S313. The reason for this lies in that, since it is considerably probable that a main object is present in the central region, the central region is made to be the region which cannot be easily extracted as the region which can be the Lo cut region as compared with the peripheral region for the purpose of preventing a fact that the main object can be easily cut in the central region.

If both of the judgements in step S309 and S314 are negated, the region is extracted in step S315 as an effective region which can be determined as the light adjustment region. In step S316, the number Mval of the effective regions is incremented by one before the flow proceeds to step S319. In step S319, a judgement is made as to whether or not the region number n reaches "5", that is, whether or not all of the regions have been subjected to the aforesaid process. If n=5, that is, if all of the regions have been subjected to the aforesaid process, the flow returns to the main program. If n does not reach "5", the flow returns to step S304 shown in FIG. 10.

As described above, by the proposed Hi, Lo cut region extraction process shown in FIGS. 10 and 11:

If the guide number GNrtn of each region calculated in response to the photometry signal at the time of the preliminary flashing operation holds a relationship:

$$GNrtn\ (n) < Khi \times X \times F \quad (8),$$

the region is extracted as the region which can be the Hi cut region.

If the relationship $$GNrtn\ (n) > Klo \times X \times F \quad (9)$$

is held, the region is extracted as the region which can be the Lo cut region.

If the relationship $$Khi \times X \times F \leq GNrtn\ (n) \leq Klo \times X \times F \quad (10)$$

is held, the region is extracted as the region which can be the light adjustment region.

FIGS. 12 to 17 shows a flowchart of a process of determining the light adjustment region to be performed in step S18 shown in FIG. 6 and a light adjustment correction quantity calculating process. In the above-mentioned process, the photometry region which is substantially used at the time of the light adjustment operation (light adjustment region) is determined, and the light adjustment correction quantity $\Delta Y$ is calculated.

Figure 15:
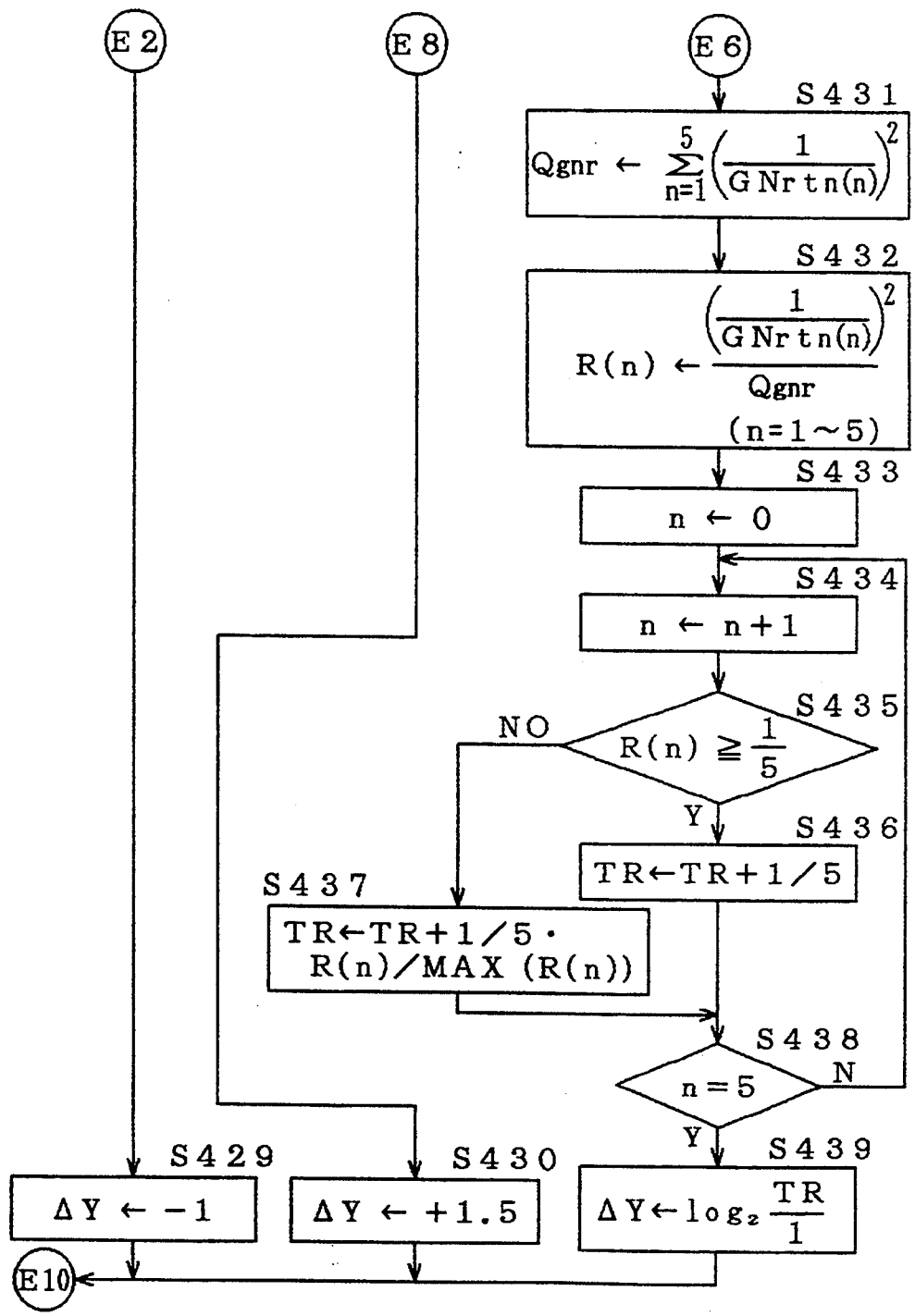

Specifically, in a case where it can be considered that the main object is positioned in the focal point detection region, the photometry region which is substantially used to control the light adjustment at the time of the main flashing operation (light adjustment region) is determined to be a central region. Then, the light adjustment quantity $\Delta Y$ at the time of amplifying the photometry output from the central photometry region is determined as follows:

(1) If anyone of the five photometry regions is not extracted as the cut region and all of them are effective regions, the reflectance distribution of each photometry region is calculated and exposure quantity TR is obtained from the reflectance distribution in steps S431 to S438 shown in FIG. 15. In step S439, the correlation quantity $\Delta Y$ is obtained from the exposure quantity TR.

(2) If anyone of the five photometry regions is extracted as the cut region, and as well as, if the central photometry region (which is the light adjustment region) has been extracted as the Hi cut region, "+1.5" is set as $\Delta Y$ in step S430 shown in FIG. 15. If the central photometry region has been extracted as the Lo cut region, "−1" is set as $\Delta Y$ in step S429 shown in FIG. 15.

Figure 14:
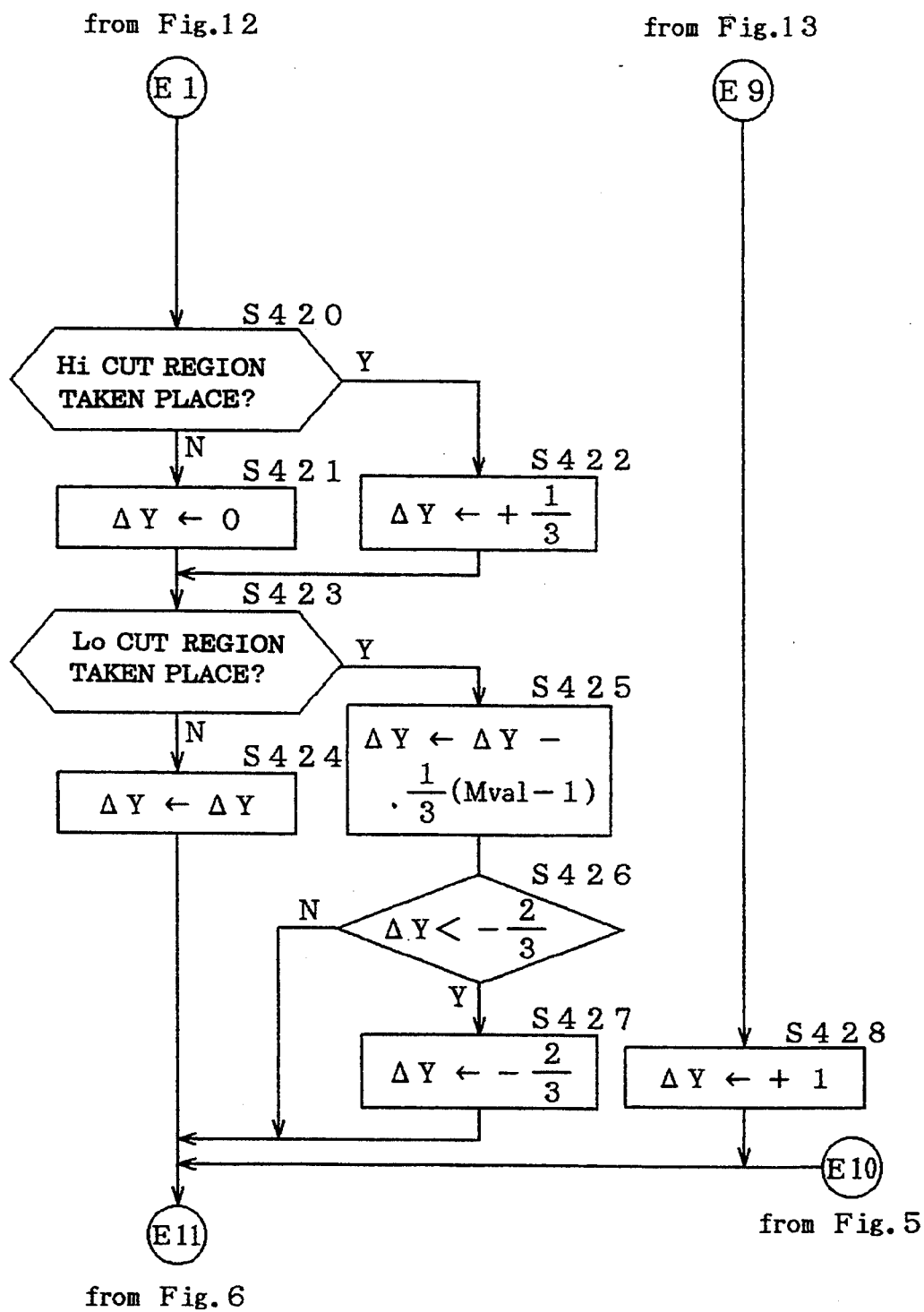

(3) If the central photometry region has been extracted as the effective region, $\Delta Y$ is calculated in accordance with the Hi cut region or the Lo cut region present in the residual four regions in steps S420 to S427 shown in FIG. 14.

Figure 13:
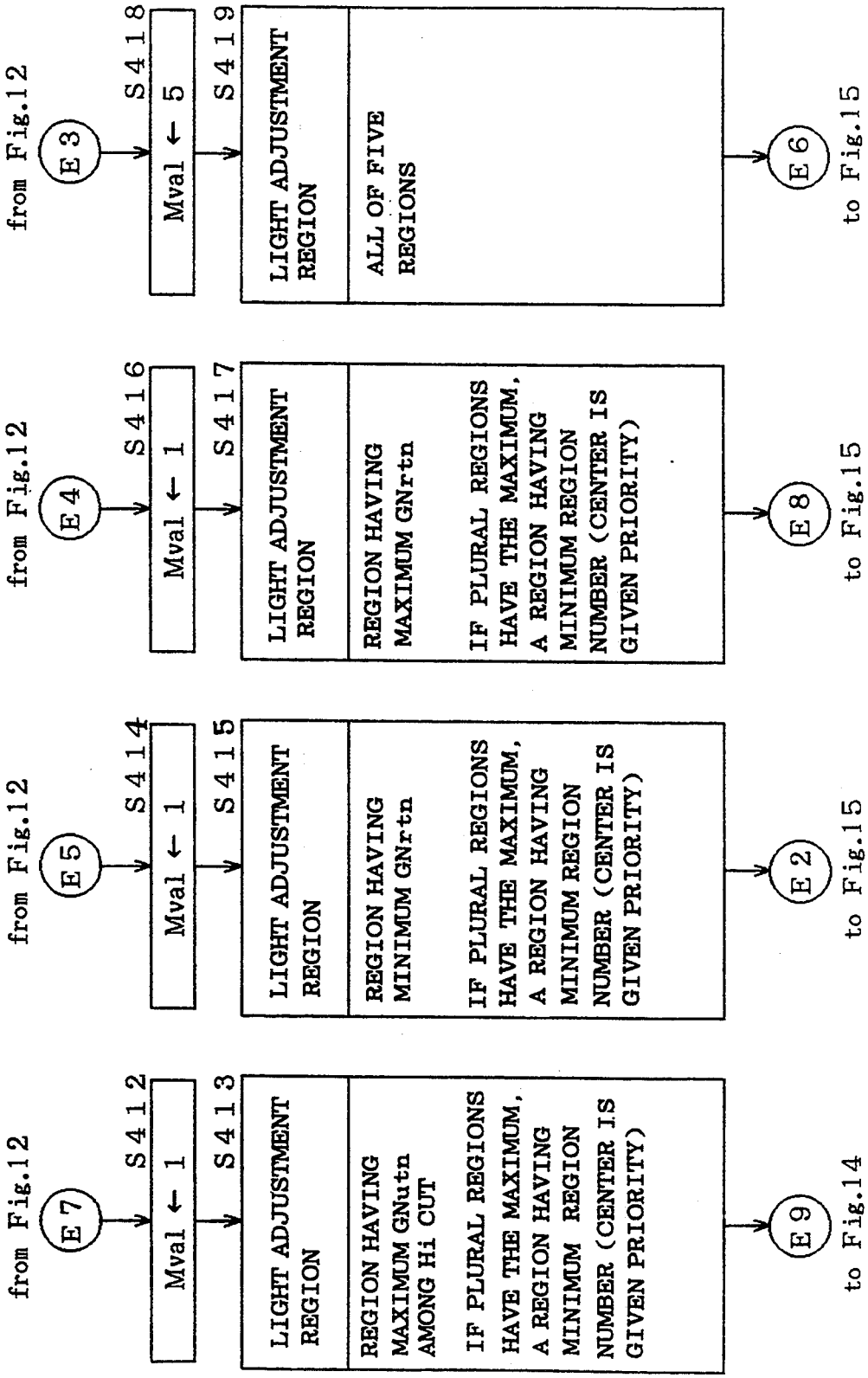

If it can be considered that the main object is not present in the focal point detection region, the light adjustment region and the correlation quantity $\Delta Y$ are determined as follows in accordance with the result of the extraction of each of the aforesaid five photometry regions:

(4) If all of the five photometry regions have been extracted as the effective regions, all of the five regions are determined as the light adjustment regions in step S419 shown in FIG. 13 and $\Delta Y$ is determined similarly to (1).

(5) If all of the five photometry regions have been extracted as the Hi cut regions, the region in which the guide number GNrtn is the maximum is determined as the light adjustment region in step S417 shown in FIG. 13, and "+1.5" is set as $\Delta Y$ in step S430.

(6) If all of the five photometry regions have been extracted as the Lo cut regions, the region in which the guide number GNrtn is the minimum is determined as the light adjustment region in step S414 shown in FIG. 13, and "−1" is set as $\Delta Y$ in step S429.

(7) If all of the five photometry regions have been extracted as the Hi cut regions or the Lo cut regions in a mixed manner, the region, in which GNrtn is the maximum among the regions extracted as the Hi cut regions, is determined as the light adjustment region in step S412 shown in FIG. 13, and "+1" is set as $\Delta Y$ in step S429.

(8) In the residual cases, all of the effective regions, which have not been extracted as the cut regions, are determined as the light adjustment regions and ΔY is determined similarly to (3).

The light adjustment correlation quantity ΔY is used to obtain the gain to be given to the gain setters 52a to 52e of the light adjustment circuit 50 at the time of the main flashing operation. If ΔY>0, the larger the quantity ΔY becomes, the smaller the gain becomes, thus causing the timing, at which the light emission is stopped at the time of the main flashing operation, to be delayed. Therefore, the light emission quantity is enlarged. If ΔY<0, the gain becomes larger in proportion to |ΔY|, thus causing timing, at which the light emission is stopped at the time of the main flashing operation, to be hastened. Therefore, the light emission quantity is reduced.

In step S401, a judgement is made as to whether or not flag FA_SC is "1", that is, whether or not the main object is present in the focal point detection region 41a. If the flag FA_SC is "1", the flow proceeds to step S402. If the flag FA_SC is "0", the flow proceeds to step S406.

In step S402, the central region is finally determined as the light adjustment region, and the flow proceeds to step S403. In step S403, a judgement is made as to whether or not all of the five regions have been extracted as the effective regions as a result of the judgement in the processing routine shown in FIGS. 10 and 11. If all of the five regions have been extracted as the effective regions, the flow proceeds to step S431 shown in FIG. 15. If the judgement in step S403 is negated, the flow proceeds to step S404 in which a judgement is made as to whether or not the central region has been extracted as the Hi cut region as a result of the judgement in the processing routine shown in FIGS. 10 and 11. If the central region has been extracted as the Hi cut region, the flow proceeds to step S430 shown in FIG. 15. If the judgement in step S404 is negated, the flow proceeds to step S405 in which a judgement is made as to whether or not the central region has been extracted as the Lo cut region as a result of the judgement in the processing routine shown in FIGS. 10 and 11. If the central region has been extracted as the Lo cut region, the flow proceeds to step S429 shown in FIG. 15. If the judgement in step S405 is negated, the flow proceeds to step S420 shown in FIG. 14.

In step S406 to S409, the following judgements are made in accordance with the results of the processing routine shown in FIGS. 10 and 11:

(1) Whether or not all of the five regions have been extracted as the effective regions, (2) Whether or not all of the five regions have been extracted as the Hi cut regions, (3) Whether or not all of the five regions have been extracted as the Lo cut regions, (4) Whether or not all of the five regions have been extracted as the cut regions and as well as the Hi cut regions and the Lo cut regions are present in a mixed manner, and (5) Whether or not the cut regions and the effective regions have been extracted in a mixed manner.

In accordance with the results of the judgements, the following process is performed:

In step S406, a judgement is made as to whether or not all of the five regions have been extracted as the effective regions. If all of the five regions have been extracted as the effective regions, the flow proceeds to step S418 shown in FIG. 13 in which "5" is set to the number of the effective regions Mval. In step S419, all of the five regions are finally determined as the light adjustment regions, and the flow proceeds to step S431 shown in FIG. 15. In step S431, the total sum of the photometry signals Qgnr of every photometry regions at the time of the preliminary flashing operation is obtained from the following equation:

$$Qgnr = \Sigma (1/GNrtn\,(n))^2 \qquad (11)$$

where Σ shows the sum total calculation of n=1 to 5.

In step S432, distribution R (n) of the photometry output signals of every photometry regions in a case where the total sum of the photometry signals of the five regions is "1" is calculated in accordance with the following equation:

$$R\,(n) = (1/GNrtn\,(n))^2 / Qgnr \qquad (12)$$

where n=1 to 5.

In step S433, the region number n is reset to zero, and then the region number n is incremented by one in step S434. In step S435, whether or not the distribution R (n) of the photometry output of each photometry region is equal or larger than "1/5" is judged. If an affirmative judgement is made, the flow proceeds to step S436. If a negative judgement is made, the flow proceeds to step S437. In step S436, new exposure quantity TR is obtained by adding "1/5" to the previous exposure quantity TR. In step S437, the new exposure quantity TR is calculated in accordance with the following equation:

$$TR = TR + (1/5) \times R\,(n)/MAX\,\{R\,(1)\,to\,R\,(5)\} \qquad (13)$$

where TR on the right side is the previous exposure quantity and MAX {R (1) to R (5)} is the maximum value of R (1) to R (5).

In step S438, a judgement is made as to whether or not the region number n reaches "5", that is, whether or not all of the regions have been subjected to the above-mentioned calculations. If the judgement in step S438 is affirmative, the flow proceeds to step S439. If the judgement in step S438 is negated, the flow returns to step S434. In step S439, the exposure quantity TR finally obtained is used to calculate the light adjustment correction quantity AY in accordance with the following equation:

$$AY = \log_2 (TR/1) \qquad (14)$$

Since the light adjustment correction quantity ΔY is calculated in accordance with the distribution R (n) of the photometry signals of every photometry regions as described above, the timing at which the main flashing is stopped in the main flashing operation (described later) can be exactly controlled.

Figure 12:
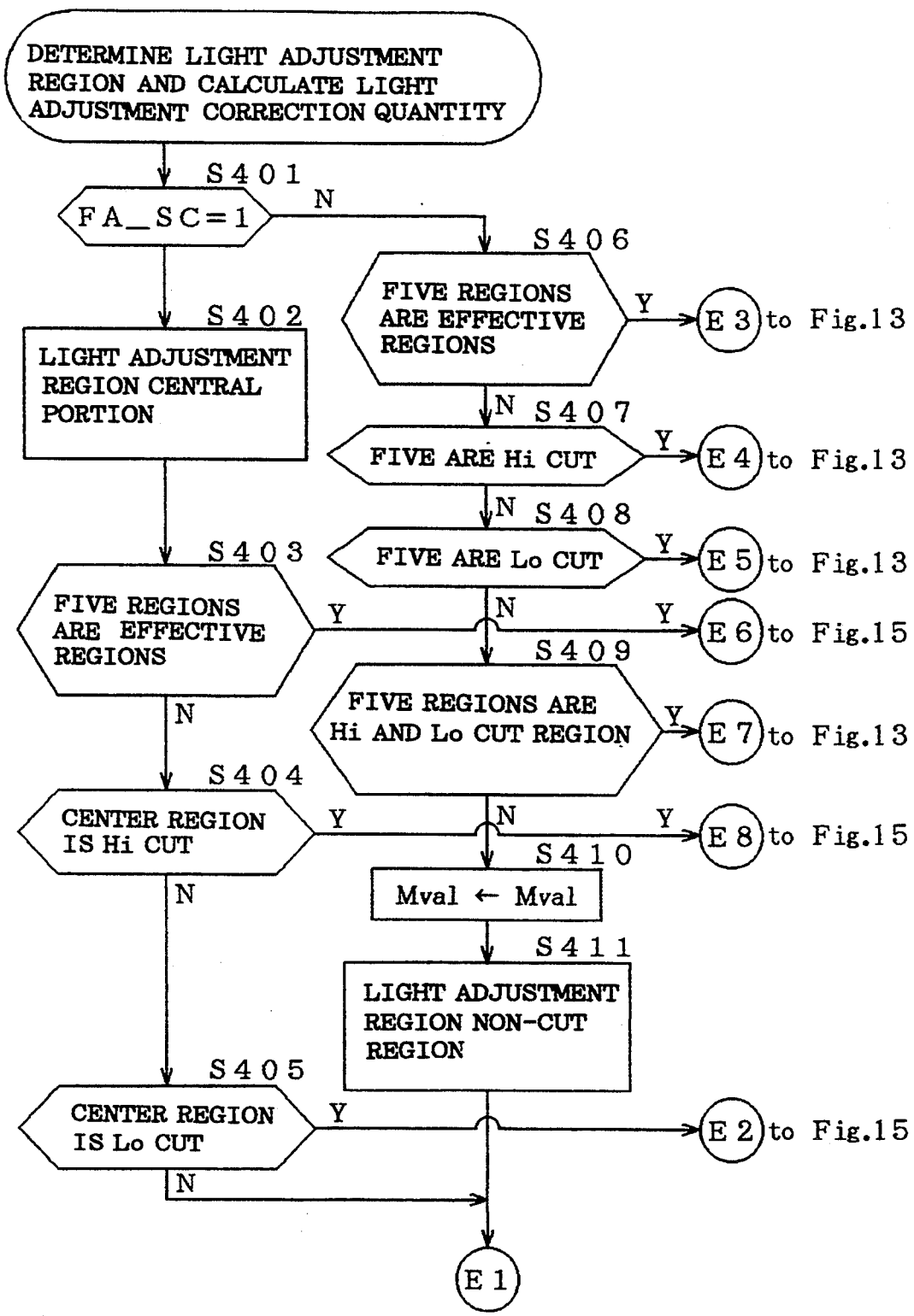

If the judgement in step S406 shown in FIG. 12 is negative, the flow proceeds to step S407. In step S407, a judgement is made as to whether or not all of the five regions have been extracted as the Hi cut regions. If all of the five regions have been extracted as the Hi cut regions, the flow proceeds to step S416 shown in FIG. 13 in which "1" is set to the number of the effective regions Mval. In step S417, the region, the guide number GNrtn (n) of which is maximum, is finally determined as the light adjustment region. The fact that the guide number GNrtn (n) is maximum means that the photometric output signal at the time of the preliminary flashing has been minimum. That is, the region thus determined is the nearest to the above-described predetermined range (effective region) which is subjected to a discrimination to be made as to whether or not it is the Hi cut region. The above-described region is a region which is expected to be receive the minimum influence of the high reflectance object among the existing five cut regions. In a case where there are a plurality of regions having the same maximum guide number, a region having a smaller region number is given priority. Then, the flow proceeds to step S430 shown in FIG. 15 in which the light adjustment correction quantity $\Delta Y$ is set to "+1.5". The reason for this lies in that, if all of the regions have been extracted as the Hi cut regions, the timing at which the light adjustment is stopped is delayed as compared with the normal timing for the purpose of preventing under-exposure.

If the judgement of step S407 shown in FIG. 12 is negated, the flow proceeds to step S408. In step S408, a judgement is made as to whether or not all of the five regions have been extracted as the Lo cut regions. If all of the regions have been extracted as the Lo cut regions, the flow proceeds to step S414 shown in FIG. 13 in which "1" is set to the number of the effective regions Mval. In step S415, a region, the guide number GNrtn (n) of which is minimum, is finally determined as the light adjustment region. The fact that the guide number GNrtn (n) is minimum means that the photometric output signal at the time of the preliminary flashing has been maximum. That is, the region thus determined is the nearest to the above-described predetermined range (effective region) which is subjected to a discrimination to be made as to whether or not it is the Lo cut region. The above-described region is a region which is expected to receive the minimum influence of a fact that reflected light of the flash is not returned among the existing five Hi cut regions. If there are a plurality of regions having the same maximum guide number, a region having the smaller region number is given priority. Then, the flow proceeds to step S429 shown in FIG. 15. In step S429, the light adjustment correction quantity $\Delta Y$ is set to "−1". The reason for this lies in that, if all of the regions have been extracted as the Lo cut regions, the timing at which the light adjustment is stopped is hastened as compared with the normal timing for the purpose of preventing over-exposure.

If the judgement made in step S408 shown in FIG. 12 is negated, the flow proceeds to step S409. In step S409, judgements are made as to whether or not all of the five regions have been extracted as the cut regions and whether or not the Hi cut regions and the Lo cut regions are present in the extracted region. If an affirmative judgement is made, the flow proceeds to step S412 shown in FIG. 13 in which "1" is set to the number of the effective regions Mval. In step S413, similarly to the case in which all of the five regions have been extracted as the Hi cut regions, a region, the guide number GNrtn (n) of which is the maximum among the extracted regions, is finally determined as the light adjustment region. Then, the flow proceeds to step S428 shown in FIG. 14 in which the light adjustment correction quantity $\Delta Y$ is set to "+1". No object to be lightened is present in the Lo cut region and therefore the flash passes rearward. Since a high reflectance object (for example, a gold-leafed fold screen or a mirror) is present in the Hi cut region, it can be considered that the main object is mixed with the high reflectance object in the Hi cut region. Therefore, in order to eliminate both the influence of the high reflectance object and that of the low reflectance object, $\Delta Y$ is set to "+1".

If a negative judgement is made in step S409 shown in FIG. 12, it is considered that the above-mentioned cut regions and the effective regions are present, and the flow proceeds to step S410. In step S410, the value of the number Mval obtained by the processing routine shown in FIGS. 10 and 11 is set to the number of the effective regions Mval. In next step S411, all of the regions extracted as the effective regions are finally determined as the light adjustment regions. Then, the flow proceeds to step S420 shown in FIG. 14 in which a judgement is made as to whether or not there is the region extracted as the Hi cut region in the five regions. If one or more Hi cut regions are present, the flow proceeds to step S422 in which the light adjustment quantity $\Delta Y$ is set to be "+⅓". If the Hi cut region is not present, the flow proceeds to step S422 in which $\Delta Y$ is set to be zero. In step S423, a judgement is made as to whether or not there is the region extracted as the Lo cut region in the five regions. If one or more regions are extracted as the Lo cut regions, the flow proceeds to step S425. If it is negated, the flow proceeds to step S424. In next step S425, the light adjustment correction quantity $\Delta Y$ is calculated in accordance with the following equation:

$$\Delta Y = \Delta Y - (\tfrac{1}{3}) \times (Mval - 1) \quad (15)$$

Then, the basis of the method of calculating the light adjustment correction quantity $\Delta Y$ which is employed in a case where there is the region extracted as the Lo cut region will now be described.

An assumption is made that nothing is present behind the main object and the magnification of the object is fixed. The number of the effective regions becomes different between a case in which the object is positioned at an end portion of the frame and a case in which the object is positioned in the vicinity of the central portion of the frame. That is, in a case where the object is positioned at the end portion of the frame, the number of the regions which contain the object is decreased and therefore the number of the effective regions (regions which are not Lo cut regions) is decreased. In a case where the object is positioned in the vicinity of the central portion of the frame, the number of the regions which contain the object is increased and therefore the number of the effective regions is increased. The area of the object in each region becomes smaller in inverse proportion to the number of the regions which contain the object, thereby causing the photometry signal at the time of the preliminary flashing operation to become smaller. Therefore, according to this embodiment, $\Delta Y$ becomes larger in the negative direction in proportion to the number of the effective region Mval as shown in equation (15).

In step S426, a judgement is made as to whether or not the calculated light adjustment correction quantity $\Delta Y$ is smaller than "−⅔". If it is smaller than "−⅔", the light adjustment correction quantity $\Delta Y$ is set to "−⅔" in step S427. If it is negated, step S427 is skipped.

If a judgement is made in step S423 that there is not a region extracted as the Lo cut region, the light adjustment correction quantity $\Delta Y$ at the time is made intact to be the light adjustment correction quantity $\Delta Y$ in step S424. That is, if there is the region which is extracted as the Hi cut region, a high reflectance object is present in the region. Therefore, although the adjacent regions do not become the Hi cut regions, it is considerably probable that the influence of the object acts on the region. Thus, $\Delta Y$ is set to be "$+\frac{1}{3}$".

Then, the flow proceeds to step S440 shown in FIG. 16 in which a judgement is made as to whether or not flag FL_D is "1". If it is "1", the flow proceeds to step S445 shown in FIG. 17. If it is not "1", a judgement is made that the object distance X cannot be detected and the flow proceeds to step S441.

If the object distance X cannot be detected, there is a risk to set the light adjustment correction quantity $\Delta Y$ to a large value. Therefore, in steps S441 to S444, a limit ranged from "$-1$" to "$+1$" is set to the calculated light adjustment correction quantity $\Delta Y$. In step S441, a judgement is made as to whether or not the light adjustment correction quantity $\Delta Y$ is larger than "1". If it is larger than "1", the flow proceeds to step S442 in which "1" is set to the light adjustment correction quantity $\Delta Y$. If it is equal or smaller than "1", the flow proceeds to step S443. In step S443, a judgement is made as to whether or not the light adjustment correction quantity $\Delta Y$ is smaller than "$-1$". If it is smaller than "$-1$", the flow proceeds to step S444 in which "$-1$" is set to the light adjustment correction quantity $\Delta Y$. If it is equal to or larger than "$-1$", the flow proceeds to step S445 shown in FIG. 17.

In step S445 shown in FIG. 17, an AE control value which is actually controlled in an exposure operation is subtracted from an ideal exposure value under stationary light calculated by the camera, that is, an automatic exposure (hereinafter called an "AE") value, and then, result of the subtraction being is set as $\Delta DC$. The case where $\Delta DC$ is not "0" is case where the photography is performed while carrying out the manual exposure or a case where the strobe synthesis second time becomes a threshold value and is deviated from the synthesis range. In step S446 to S450, $\Delta Y$ is re-corrected according to the value of $\Delta DC$. In step S446, a judgement is made as to whether or not $\Delta DC$ is smaller than "$-1$". If it is smaller than "$-1$", the flow proceeds to step S447. If it is negated, the flow proceeds to step S448. The ideal exposure value under stationary light is controlled to be a value under 1EV depending upon a fact that $\Delta DC$ is smaller than "$-1$". Therefore, re-correction is not performed and the light adjustment correction quantity $\Delta Y$ is made the value as it is in step S447.

In step S448, a judgement is made as to whether or not the light adjustment correction quantity $\Delta Y$ holds a relationship $-1 \leq \Delta DC \leq 0$. If an affirmative judgement is made, the flow proceeds to step S449. If it is negated, the flow proceeds to step S450. In step S449, the light adjustment correction quantity $\Delta Y$ is calculated in accordance with the following equation:

$$\Delta Y = \Delta Y - ((19 - AVE)/24) \times (\Delta DC + 1) \qquad (16)$$

where AVE is an average value of brightness value BV (n) (n = 1 to 5) detected by the photometer device 8 for exposure control. According to equation (16), correction is performed in such a manner that the quantity of light emission is reduced by a quantity corresponding to the degree of illumination of main object made with stationary light. Therefore, the light adjustment correction quantity $\Delta Y$ becomes negative in proportion to the value of $\Delta DC$. In other words, the smaller the brightness of the main object becomes and the larger $\Delta DC$ becomes, the larger the compensate amount for the light adjustment correction quantity $\Delta Y$ gets in negative direction.

If a negative judgement is made in step S448, that is, if $\Delta DC$ is positive, the light adjustment correction quantity $\Delta Y$ is calculated in accordance with the following equation:

$$\Delta Y = \Delta Y - ((19 - AVE)/24) \qquad (17)$$

When the aforesaid process has been completed, the flow returns to the main program.

FIGS. 18 and 19 illustrate a flowchart showing the main flashing operation to be performed in step S20 shown in FIG. 6.

In step S501, the region number n is reset to zero, and in next step S502, the region number n is incremented by one. In step S503, a judgement is made as to whether or not the photometry region designated with the region number n is set to the light adjustment region. If an affirmative judgement is made, the flow proceeds to step S504. If it is negated, the flow proceeds to step S505. In step S504, the light adjustment correction quantity $\Delta Y$ calculated in the above-mentioned step is used to calculate gain Ghon (n) to be given to the gain setter of the light adjustment circuit 50 in accordance with the following equation:

$$Ghon\ (n) = \gamma (SV + \log_2 (1/Mval) - S\beta - \Delta Y) \qquad (18)$$

where SV is the ISO sensitivity of the film, $S\beta$ is the lens correction coefficient, $\Delta Y$ is the light adjustment correction quantity and $\gamma$ is a constant.

If a judgement is made in step S503 that the region is not the light adjustment region, a value which is sufficiently small (for example, $-10$) is set to gain Ghon (n) in step S505. As a result, the photometry output from the photometry region except for the light adjustment region does not contribute to the light adjustment operation.

In step S506, a judgement is made as to whether or not the region number n reaches "5". If a negative judgement is made, the flow returns to step S502 in which the aforesaid process is repeated. If an affirmative judgement is made, the flow proceeds to step S507 shown in FIG. 19.

As a result of the above-mentioned process, gains Ghon (1) to Ghon (5) are respectively set to the gain setters 52a to 52e.

In step S507 shown in FIG. 19, the electronic flashing device 11 is caused to perform main flashing. In next step S508, the photometry is performed by the light adjustment photoreceptor 13. That is, illuminating light emitted at the time of the main flashing operation is reflected by the object before it passes through the photographic lens 2 and is reflected by the surface of the film. Then, it is received by the five divisional photoreceptor elements 13a to 13e. Photometric signals IG (1) to IG (5) of the divisional photoreceptor elements 13a to 13e are respectively supplied to the amplifiers 51a to 51e of the light adjustment circuit 50. The amplifiers 51a to 51e amplify the photometric signals IG (1) to IG (5) with the gains Ghon (1) to Ghon (5) set by the gain setters 52a to 52e so that amplified signals IG (1) to IG (5) are transmitted to the adder circuit 54. The adder circuit 54 adds the thus supplied amplified signals. In step S509, the CPU 31 transmits a command signal to the integrating circuit 55. The integrating circuit 55 time-integrates the result of the addition performed by the adder circuit 54, that is, the total sum of the amplified photometry signals IG (1) to IG (5). The result of the integration performed by the integrating circuit 55 is made to be IG.

In step S510, the CPU 31 transmits a predetermined light adjustment level to the conversion circuit 56. The conversion circuit 56 converts the above-described level into an analog signal. The converted light adjustment level LV and the output IG from the above-mentioned integrating circuit 55 are transmitted to the comparator 57 in which a comparison is made so as to discriminate whether or not IG has reached the light adjustment level LV. If a judgement is made that IG has not reached the light adjustment level LV in accordance with a signal transmitted from the comparator 57, the flow returns to step S508. If a judgement is made that IG has reached the light adjustment level LV, the flow proceeds to step S511 in which the light emission control circuit 38 of the electronic flashing device 11 is controlled so that the main flashing is stopped.

By employing the above-mentioned procedure, the gain Ghon (n) is obtained on the basis of the light adjustment correction quantity $\Delta Y$. If $\Delta Y > 0$, the timing at which the main flashing is stopped is delayed in proportion to the value and therefore the quantity of light to be emitted in enlarged. In other words, the larger the amount of $\Delta Y$ becomes, the later the main flashing is stopped and the more the quantity of light to be emitted gets. If $\Delta Y < 0$, the timing at which the main flashing is stopped is hastened in proportion to $|\Delta Y|$ and therefore the quantity of light to be emitted is reduced. In other words, the larger the amount of $|\Delta Y|$ becomes, the faster the main flashing is stopped and the less the quantity of light to be emitted gets.

As described above, in accordance with the focal point adjustment mode set with the focal point adjustment setting switch 40 and the state of focusing of the automatic focal point adjustment device detected by the focal point detection optical system 41 and the focal point detection circuit 39, the proportion of the contribution of a plurality of the photometric outputs transmitted from the light adjustment photoreceptor device 13 to the light adjustment is calculated. On the basis of the proportion thus calculated, the flashing of the electronic flashing device 11 is adjusted. Therefore, even if a main object is present in a region in which a high reflectance object such as a mirror is present or a region the background of which is positioned far away, the photometry output from such region is no cut and thus a proper light adjustment with respect to a main object can be performed.

In a case where the focal point adjustment mode is the continuous AF servo mode, the proportion of the contribution to the light adjustment is calculated so as to regard the photometry output from the central photometry region of the light adjustment photoreceptor device 13, which overlaps the focal point detection region of the focal point detection optical system 41, as important. Therefore, a proper light adjustment with respect to the main object can be performed in a case where there is a considerable probability that the main object is present in the focal point detection region as in the case where the continuous AF servo mode is selected.

Furthermore, in a case where the state of focusing of the photographic lens 2 detected by the focal point detection circuit 39 represents that the detected deviation of focusing is smaller than a predetermined deviation of focusing, the proportion of the contribution to the light adjustment is calculated so as to regard the photometry output from the central photometry region of the light adjustment photoreceptor device 13, which overlaps the focal point detection region of the focal point detection optical system 41, as important similarly to the continuous AF servo mode. Therefore, a proper light adjustment with respect to the main object can be performed in a case where there is a considerably probable that the main object is present in the focal point detection region as in the case where the state of focusing of the photographic lens 2 detected by the focal point detection circuit represents that the detected deviation of focusing is smaller than a predetermined deviation of focusing.

The number of the divisions of the photometer device for exposure calculating and the photoreceptor device for light adjustment is not limited to the above-mentioned embodiment and it may be 1 to 4 or 6 or more. Furthermore, the number of divisions of the photometer device for exposure calculating and that of the photoreceptor device for light adjustment may be different from each other. Also an arrangement of the focal point detection region is not limited to those of the above-mentioned embodiment.

What is claimed is:

1. An automatic light adjustment device for a camera having:
   an automatic focal point adjusting device for controlling a photographic lens to a focusing position in accordance with a result of focal detection;
   a photometry device which divides light emitted from a flashing device at each time of main flashing and preliminary flashing prior to said main flashing, and reflected by a subject into a plurality of photometry regions so as to receive light; and
   a control device for adjusting light to be emitted from said flashing device in accordance with a plurality of photometry outputs transmitted from said photometry device;
   said automatic light adjustment device for a camera comprising:
   a focal point adjustment information output device for outputting information relating to a focal adjustment of said automatic focal point adjusting device such as a continuous automatic focus mode in which said photographic lens is continuously moved so as to always focus on an object, a single automatic focus mode in which, if said photographic lens once focuses on said object, an ensuing focal point adjustment operation is stopped, and information relating to a focus deviation quantity obtained by said automatic focal point adjusting device;
   a light adjustment region determining device for determining from said plurality of photometry regions a substantially central photometry region, which superimposes a focus detection area in said continuous automatic focus mode to be said light adjustment region which is mainly used in light adjustment performed by said control device at said main flashing, and, in said single automatic focus mode, for determining from said plurality of photometry regions a substantially central photometry region, which superimposes a focus detection area to be said light adjustment region if said focus deviation quantity is smaller than said predetermined value, and determining from said plurality of said photometry region to be said light adjustment region in accordance with each photometry output at the time of said preliminary flashing if said focus deviation quantity is larger than said predetermined value; and a calculating device for calculating a ratio of contribution of each photometric output transmitted from said photometry device at the time of said preliminary flashing to light adjustment in such a manner that said ratio of said light adjustment region determined by said light adjustment region determining device is large compared to said ratio of a photometry region other than said light adjustment region which is substantially zero;

wherein said control device controls light emitted from said flashing device during said main flashing in accordance with a calculated ratio.

2. An automatic light adjustment device for a camera, comprising:

a focus detection device which has a focus detection area;

a photometry device which divides light emitted from a flashing device at the time of main flashing and reflected by an object into a plurality of photometry regions at least one of which does not superimpose said focus detection area; and a control device electrically connected to said focus detection device and to said photometry device to adjust light to be emitted from said flashing device in accordance with a plurality of photometry outputs transmitted from said photometry device, said control device producing information relating to a focus condition on said focus detection area, calculating a ratio of contribution of each photometric output transmitted from said photometry device to light adjustment in accordance with said information relating to a focus condition on said focus detection area, and controlling light to be emitted from said flashing device in accordance with said calculated ratio.

3. An automatic light adjustment device for a camera according to claim 2, wherein:

said focus detection device includes a focus deviation quantity detection device for detecting a focus deviation quantity from a focusing point;

said information relating to a focus condition includes at least information relating to said focus deviation quantity obtained by said focus deviation quantity detection device;

said control device further determines one of said plurality of photometry regions to be a light adjustment region, which is mainly used in light adjustment control at the time of said main flashing;

wherein if said focus deviation quantity is equal to or less than a predetermined value, said control device determines a photometry region overlapping said focus detection area to be said light adjustment region; and if said focus deviation quantity is larger than said predetermined value, said control device determines, in accordance with each photometry output from a plurality of said photometry regions, a photometry region to be said light adjustment region.

4. An automatic light adjustment device for a camera according to claim 3, wherein:

if said focus deviation quantity is equal to or less than a predetermined value, said control device discriminates if an output from said photometry region determined to be said light adjustment region is within a predetermined range, larger than said predetermined range, or smaller than said predetermined range, and calculates said ratio of contribution of said light adjustment in accordance with said discrimination; and said control device adjusts light in accordance with said calculated ratio.

5. An automatic light adjustment device for a camera according to claim 4, wherein:

said photometry device also divides light emitted from a flashing device at the time of preliminary flashing prior to said main flashing and reflected by an object into a plurality of photometry regions so as to receive light;

said control device calculates an amount for light control corresponding to said ratio in such a manner that an amount of light emitted from said flashing device during said main flashing, when the output from said determined photometry region at the time of said preliminary flashing is larger than said predetermined range, is more than the amount of light emitted from said flashing device during said main flashing when the output from said determined photometry region at the time of said preliminary flashing is within said predetermined range; and the amount of light emitted from said flashing device during said main flashing, when the output from said determined photometry region at the time of said preliminary flashing is smaller than said predetermined range, is less than the amount of light emitted from said flashing device during said main flashing when the output from said determined photometry region at the time of said preliminary flashing is within said predetermined range.

6. An automatic light adjustment device for a camera according to claim 5, wherein said control device includes:

amplifiers for respectively amplifying photometry outputs from a plurality of said photometry regions;

an addition circuit for adding said photometry outputs with each other after said amplifiers amplify said signals;

an integrating circuit for integrating the output from said addition circuit;

a comparator for transmitting a light-emission stop signal for stopping light emission of said flashing device when the output from said integrating circuit exceeds a reference value; and gain adjustment means for increasing the gain of said amplifier for amplifying said photometry output from said light adjustment region as said calculated amount for light control is decreased, and minimizing said gain of said amplifier for amplifying said photometry output from said photometry region other than the photometry region determined as said light adjustment region.

7. An automatic light adjustment device for a camera according to claim 5, wherein said control device includes:

amplifiers for respectively amplifying photometry outputs from a plurality of said photometry regions;

an addition circuit for adding said photometry outputs with each other after said amplifiers amplify said signals;

an integrating circuit for integrating the output from said addition circuit; and a comparator for transmitting a light-emission stop signal for stopping light emission of said flashing device when the output from said integrating circuit exceeds a reference value;

and wherein said reference value is reduced in proportion to said calculated amount for light control.

8. An automatic light adjustment device for a camera according to claim 4, wherein:

said photometry device also divides light emitted from a flashing device at the time of said preliminary flashing and reflected by an object into a plurality of photometry regions so as to receive light;

wherein if said focus deviation quantity is larger than a predetermined value, said control device determines said photometry region having an output which is within a predetermined range at the time of said preliminary flashing to be said light adjustment region;

said control device does not determine said photometry region having an output which is deviated from said predetermined range at the time of said preliminary flashing to be said light adjustment region; and if all of a plurality of said photometry outputs at the time of said preliminary flashing are deviated from said predetermined range, said control device determines any one of said photometry regions to be said light adjustment region in accordance with each photometry output.

9. An automatic light adjustment device for a camera according to claim 8, wherein, if said focus deviation quantity is larger than said predetermined value, said control device calculates a guide number in accordance with said photometry output at the time of said preliminary flashing and determines if a plurality of said photometry regions can be used as said light adjustment regions in accordance with said calculated guide number being one of larger and smaller than a reference guide number calculated from a photographic distance, a control aperture value and a coefficient.

10. An automatic light adjustment device for a camera according to claim 8, wherein, if said focus deviation quantity is larger than a predetermined value, said control device determines a region having a minimum output to be said light adjustment region in a case where all of a plurality of said photometry outputs are larger than a predetermined range;

said control device determines a region having a maximum output to be said light adjustment region in a case where all of a plurality of said photometry outputs are smaller than said predetermined range; and said control device determines a region, the output from which is a minimum among a plurality of said photometry regions whose outputs are larger than said predetermined range, to be said light adjustment region in a case where all of a plurality of said photometry outputs are one of larger and smaller than said predetermined range.

11. An automatic light adjustment device for a camera, comprising:

a focus detection device which has a focus detection area;

a photometry device which divides light emitted from a flashing device at the time of main flashing and reflected by an object into a plurality of photometry regions at least one of which does not superimpose said focus detection area;

a focal point adjusting device which drives a photographic lens; and a control device electrically connected to said focus detection device, to said photometry device and to said focal point adjusting device to adjust light to be emitted from said flashing device in accordance with a plurality of photometry outputs transmitted from said photometry device, said control device producing information relating to a focal point adjustment on said focus detection area, calculating a ratio of contribution of each photometric output transmitted from said photometry device to light adjustment in accordance with said information relating to a focal point adjustment on said focus detection area, and controlling light to be emitted from said flashing device in accordance with said calculated ratio.

12. An automatic light adjustment device for a camera according to claim 11, wherein:

said information relating to said focal point adjustment includes at least information on whether said focal point adjusting device is operating in one of a continuous automatic focus mode in which said photographic lens is continuously moved so as to always focus on an object and a single automatic focus mode in which if said photographic lens once focuses on said object, an ensuing focal point adjustment operation is stopped;

said control device further determines one of said plurality of photometry regions to be a light adjustment region which is mainly used in light adjustment control at the time of said main flashing; and said control device determines a substantially central photometry region, which superimposes a focus detection area, to be said light adjustment region when said focal point adjusting device is operating in said continuous automatic focus mode, and, in accordance with each photometry output from a plurality of said photometric regions, determines one of said plurality of photometry regions to be said light adjustment region when said focal point adjusting device is operating is said single automatic focus mode.

13. An automatic light adjustment device for a camera according to claim 12, wherein:

when said focal point adjusting device is operating in said continuous automatic focus mode, said control device discriminates if an output from said substantially central photometry region determined to be said light adjustment region is within a predetermined range, larger than said predetermined range, or smaller than said predetermined range, and calculates said ratio of contribution of said light adjustment in accordance with said discrimination; and said control device adjusts light in accordance with said calculated ratio.

14. An automatic light adjustment device for a camera according to claim 13, wherein:

said photometry device also divides light emitted from a flashing device at the time of preliminary flashing prior to said main flashing and reflected by an object into a plurality of photometry regions so as to receive light;

said control device calculates an amount for light control corresponding to said ratio in such a manner that an amount of light emitted from said flashing device during said main flashing, when the output from said substantially central photometry region at the time of said preliminary flashing is larger than said predetermined range, is more than the amount of light emitted from said flashing device when the output from said substantially central photometry region at the time of said preliminary flashing is within said predetermined range; and the amount of light emitted from said flashing device during said main flashing, when the output from said substantially central photometry region at the time of said preliminary flashing is smaller than said predetermined range, is less than the amount of light emitted from said flashing device during said main flashing when the output from said substantially central photometry region at the time of said preliminary flashing is within said predetermined range.

15. An automatic light adjustment device for a camera according to claim 14, wherein said control device includes:
  amplifiers for respectively amplifying photometry outputs from a plurality of said photometry regions;
  an addition circuit for adding said photometry outputs with each other after said amplifiers amplify said signals;
  an integrating circuit for integrating the output from said addition circuit;
  a comparator for transmitting a light-emission stop signal for stopping light emission of said flashing device when the output from said integrating circuit exceeds a reference value; and
  gain adjustment means for increasing the gain of said amplifier for amplifying said photometry output from said light adjustment region as said calculated amount for light control is decreased, and minimizing said gain of said amplifier for amplifying said photometry output from said photometry region other than the photometry region determined as said light adjustment region.

16. An automatic light adjustment device for a camera according to claim 14, wherein said control device includes:
  amplifiers for respectively amplifying photometry outputs from a plurality of said photometry regions;
  an addition circuit for adding said photometry outputs with each other after said amplifiers amplify said signals;
  an integrating circuit for integrating the output from said addition circuit; and
  a comparator for transmitting a light-emission stop signal for stopping light emission of said device when the output from said integrating circuit exceeds a reference value;
  wherein said reference value is reduced in proportion to said calculated amount for light control.

17. An automatic light adjustment device for a camera according to claim 12, wherein:
  said photometry device also divides light emitted from a flashing device at the time of preliminary flashing prior to said main flashing and reflected by an object into a plurality of photometry regions so as to receive light;

wherein in said single automatic focus mode, said control device determines said photometry region having an output that is within a predetermined range at the time of said preliminary flashing to be said light adjustment region;
said control device does not determine said photometry region having an output which is deviated from said predetermined range at the time of said preliminary flashing to be said light adjustment region; and
if all of a plurality of photometry outputs at the time of said preliminary flashing are deviated from said predetermined range, said control device determines any one of said photometry regions to be a light adjustment region in accordance with each photometry output.

18. An automatic light adjustment device for a camera according to claim 17, wherein, in said single automatic focus mode, said control device calculates a guide number in accordance with said photometry output at the time of said preliminary flashing, and determines if a plurality of said photometry regions can be used as said light adjustment regions when said calculated guide number is one of larger and smaller than a reference guide number calculated from a photographic distance, a control aperture value and a coefficient.

19. An automatic light adjustment device for a camera according to claim 18, wherein:
  in a case where a lens position detector for detecting the lens position in said photographic lens is provided, a result of the detection is used as said photographic distance; and
  in a case where said lens detector is not provided, each distance determined as the distance to said object included in a central region and the distance to said object included in the peripheral region is used as said photographic distance.

20. An automatic light adjustment device for a camera according to claim 17, wherein:
  in said single automatic focus mode, said control device determines a region having a minimum output among a plurality of photometry outputs to be said light adjustment region in a case where all of a plurality of said photometry outputs are larger than a predetermined range;
  said control device determines a region having a maximum output among a plurality of photometry outputs to be said light adjustment region in a case where all of a plurality of said photometry outputs are smaller than said predetermined range; and
  said control device determines a region having a minimum output among a plurality of said photometry regions whose outputs are larger than said predetermined range, to be said light adjustment region in a case where all of a plurality of said photometry outputs are one of larger and smaller than said predetermined range.

21. An automatic light adjustment device for a camera according to claim 11, wherein:
  said photometry device also divides light emitted from a flashing device at the time of preliminary flashing prior to said main flashing and reflected by an object into a plurality of photometry regions so as to receive light;
  said information relating to said focal point adjustment includes at least information relating to a focus deviation quantity obtained by said focal point adjusting device;

said control device further determines one of said plurality of photometry regions to be the light adjustment region, which is mainly used in said light adjustment control at the time of said main flashing;

wherein if said focus deviation quantity is less than a predetermined value, said control device determines a photometry region superimposing said focus detection area to be said light adjustment region; and if said focus deviation quantity is larger than said predetermined value, said control device determines said light adjustment region from a plurality of said photometry regions, in accordance with each photometry output at the time of said preliminary flashing.

22. An automatic light adjustment device for a camera according to claim 21, wherein:

if said focus deviation quantity is less than said predetermined value, said control device discriminates if an output from said photometry region determined to be said light adjustment region is within said predetermined range, larger than said predetermined range, or smaller than said predetermined range, and calculates said ratio of contribution of light adjustment in accordance with said discrimination; and said control device adjusts light in accordance with said calculated ratio.

23. An automatic light adjustment device for a camera according to claim 22, wherein:

said control device calculates an amount for light control corresponding to said ratio such that an amount of light emitted from said flashing device during said main flashing, when the output from said substantially central photometry region at the time of said preliminary flashing is larger than said predetermined range, is more than the amount of light emitted from said flashing device during said main flashing when the output from said substantially central photometry region at the time of said preliminary flashing is within said predetermined range; and the amount of light emitted from said flashing device during said main flashing, when the output from said substantially central photometry region at the time of said preliminary flashing is smaller than said predetermined range, is less than the amount of light emitted from said flashing device during said main flashing when the output from said substantially central photometry region at the time of said preliminary flashing is within said predetermined range.

24. An automatic light adjustment device for a camera according to claim 23, wherein said control device includes:

amplifiers for respectively amplifying photometry outputs from a plurality of said photometry regions;

an addition circuit for adding said photometry outputs with each other after said amplifiers amplify said signals;

an integrating circuit for integrating the output from said addition circuit;

a comparator for transmitting a light-emission stop signal for stopping light emission of said flashing device when the output from said integrating circuit exceeds a reference value; and gain adjustment means for increasing the gain of said amplifier for amplifying said photometry output from said light adjustment region as said calculated amount for light control is decreased, and minimizing said gain of said amplifier for amplifying said photometry output from said photometry region other than the photometry region determined as said light adjustment region.

25. An automatic light adjustment device for a camera according to claim 23, wherein said control device includes:

amplifiers for respectively amplifying photometry outputs from a plurality of said photometry regions;

an addition circuit for adding said photometry outputs with each other after said amplifiers amplify said signals;

an integrating circuit for integrating the output from said addition circuit; and a comparator for transmitting a light-emission stop signal for stopping light emission of said device when the output from said integrating circuit exceeds a reference value;

and wherein said reference value is reduced in proportion to said calculated amount for light control.

26. An automatic light adjustment device for a camera according to claim 21, wherein:

if said focus deviation quantity is larger than a predetermined value, said control device determines said photometry region having an output which is within a predetermined range at the time of said preliminary flashing to be said light adjustment region;

said control device does not determine said photometry region having an output which is deviated from said predetermined range at the time of said preliminary flashing to be said light adjustment region; and if all of a plurality of said photometry outputs at the time of said preliminary flashing are deviated from said predetermined range, said control device determines any one of said photometry regions to be said light adjustment region in accordance with each photometry output.

27. An automatic light adjustment device for a camera according to claim 26, wherein, if said focus deviation quantity is larger than a predetermined value, said control device region determining means calculates a guide number in accordance with said photometry output at the time of said preliminary flashing, and determines if a plurality of said photometry regions can be used as said light adjustment regions in accordance with said calculated guide number being one of larger and smaller than a reference guide number calculated from a photographic distance, a control aperture value and a coefficient.

28. An automatic light adjustment device for a camera according to claim 26, wherein:

if said focus deviation quantity is larger than a predetermined value, said control device determines a photometry region having a minimum output to be said light adjustment region in a case where all of a plurality of said photometry outputs are larger than a predetermined range;

said control device determines a photometry region having a maximum output to be said light adjustment region in a case where all of a plurality of said photometry outputs are smaller than said predetermined range; and said control device determines a photometry region, the output from which is a minimum among a plurality of said photometry regions whose outputs are larger than said predetermined range, to be said light adjustment region in a case where all of a plurality of said photometry outputs are one of larger and smaller than said predetermined range.

29. An automatic light adjustment device for a camera, comprising:

a focus detection device which has a focus detection area;

a photometry device which divides light emitted from a flashing device at the time of main flashing and reflected by an object into a plurality of photometry regions having a predetermined region which super imposes said focus detection area;

a control device electrically connected to said focus detection device and to said photometry device to adjust light to be emitted from said flashing device in accordance with a plurality of photometry outputs transmitted from said photometry device, said control device producing information relating to a focus condition on said focus detection area, calculating a ratio of contribution of photometric output corresponding to said predetermined region to light adjustment in accordance with said information relating to a focus condition on said focus detection area, and controlling light to be emitted from said flashing device in accordance with said calculated ratio.

30. An automatic light adjustment device for a camera, comprising:

a focus detection device which has a focus detection area;

a photometry device which divides light emitted from a flashing device at the time of main flashing and reflected by an object into a plurality of photometry regions having a predetermined region which superimposes said focus detection area;

a focal point adjusting device which drives a photographic lens; and a control device electrically connected to said focus detection device, to said photometry device and to said focal point adjusting device to adjust light to be emitted from said flashing device in accordance with a plurality of photometry outputs transmitted from said photometry device, said control device producing information relating to a focal point adjustment on said focus detection area, calculating a ratio of contribution of photometric output corresponding to said predetermined region to light adjustment in accordance with said information relating to a focal point adjustment on said focus detection area, and controlling light to be emitted from said flashing device in accordance with said calculated ratio.

31. A camera, comprising:

a focus detection device which has a first focus detection area and a second focus detection area, each of which is extended in a different direction;

a photometry device which divides light emitted from a flashing device and reflected by an object into a plurality of photometry regions having a predetermined region which superimposes said focus detection areas; and a control device electrically connected to said focus detection device and to said photometry device to adjust light to be emitted from said flashing device in accordance with an output from said focus detection device and a plurality of photometry outputs from said photometry device.

32. A camera according to claim 31, wherein said first and said second focus detection areas are crossed with each other.

33. A camera according to claim 32, wherein said first focus detection area is extended in a first direction which is substantially parallel to a longitudinal direction of a field to be photographed, and wherein said second focus detection area is extended in a second direction which substantially perpendicular to said first direction.

* * * * *